United States Patent
Erlingsson

(10) Patent No.: US 9,171,149 B2
(45) Date of Patent: Oct. 27, 2015

(54) METHODS AND SYSTEMS FOR IMPLEMENTING A SECURE APPLICATION EXECUTION ENVIRONMENT USING DERIVED USER ACCOUNTS FOR INTERNET CONTENT

(71) Applicant: Google Inc., Mountain View, CA (US)

(72) Inventor: Úlfar Erlingsson, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/522,882

(22) Filed: Oct. 24, 2014

(65) Prior Publication Data

US 2015/0047030 A1    Feb. 12, 2015

Related U.S. Application Data

(63) Continuation of application No. 10/456,805, filed on Jun. 6, 2003, now abandoned.

(60) Provisional application No. 60/387,176, filed on Jun. 6, 2002.

(51) Int. Cl.
| | |
|---|---|
| G06F 21/53 | (2013.01) |
| H04L 29/06 | (2006.01) |
| G06F 21/51 | (2013.01) |

(52) U.S. Cl.
CPC .............. G06F 21/53 (2013.01); G06F 21/51 (2013.01); H04L 63/1483 (2013.01)

(58) Field of Classification Search
None
See application file for complete search history.

(56) References Cited

U.S. PATENT DOCUMENTS

| | | |
|---|---|---|
| 5,265,206 A | 11/1993 | Shackelford et al. |
| 5,537,548 A | 7/1996 | Fin et al. |
| 5,619,639 A | 4/1997 | Mast |
| 5,634,102 A | 5/1997 | Capps |
| 5,760,769 A | 6/1998 | Petrie et al. |
| 5,764,985 A | 6/1998 | Smale |
| 5,768,519 A | 6/1998 | Swift et al. |
| 5,787,428 A | 7/1998 | Hart |
| 5,797,128 A | 8/1998 | Birnbaum |
| 5,832,263 A | 11/1998 | Hansen et al. |
| 5,956,507 A | 9/1999 | Shearer, Jr. et al. |
| 5,974,470 A | 10/1999 | Hammond |
| 5,991,877 A | 11/1999 | Luckenbaugh |

(Continued)

FOREIGN PATENT DOCUMENTS

WO    WO 98/21683 A    5/1998

OTHER PUBLICATIONS

Cowart, "Special Edition Using Microsoft Windows XP Professional" Dec. 4, 2001, 7 sheets.*

(Continued)

*Primary Examiner* — Gilberto Barron, Jr.
*Assistant Examiner* — Devin Almeida
(74) *Attorney, Agent, or Firm* — Sterne, Kessler, Goldstein & Fox PLLC

(57) ABSTRACT

Methods and systems are disclosed for implementing a secure application execution environment using Derived User Accounts (SAE DUA) for Internet content. Content is received and a determination is made if the received content is trusted or untrusted content. The content is accessed in a protected derived user account (DUA) such as a SAE DUA if the content is untrusted otherwise the content is accessed in a regular DUA if the content is trusted.

21 Claims, 15 Drawing Sheets

(56) References Cited

U.S. PATENT DOCUMENTS

| | | |
|---|---|---|
| 6,092,194 A | 7/2000 | Touboul |
| 6,141,754 A | 10/2000 | Choy |
| 6,154,844 A | 11/2000 | Touboul et al. |
| 6,275,938 B1 | 8/2001 | Bond et al. |
| 6,289,458 B1 | 9/2001 | Garg et al. |
| 6,385,724 B1 | 5/2002 | Beckman et al. |
| 6,453,418 B1 | 9/2002 | Ooki et al. |
| 6,505,300 B2 | 1/2003 | Chan et al. |
| 6,513,111 B2 | 1/2003 | Klimczak et al. |
| 6,529,985 B1 | 3/2003 | Deianov et al. |
| 6,587,888 B1 | 7/2003 | Chieu et al. |
| 6,772,350 B1 | 8/2004 | Belani et al. |
| 6,907,396 B1 | 6/2005 | Muttik et al. |
| 2002/0019941 A1* | 2/2002 | Chan et al. ............ 713/185 |
| 2002/0188649 A1 | 12/2002 | Karim |
| 2004/0006706 A1 | 1/2004 | Erlingsson |

OTHER PUBLICATIONS

Islam Nayeem et al: "A Flexible Security System for using Internet Content" IEEE Software, IEEE Computer Society, Los Alamitos, US, vol. 14, No. 5, 1997, pp. 52-59.

International Search Report directed to related International Application No. PCT/US03/17795, dated Feb. 18, 2004, 3 pages.

* cited by examiner

METHODS AND SYSTEMS FOR IMPLEMENTING A SECURE APPLICATION EXECUTION ENVIRONMENT USING DERIVED USER ACCOUNTS FOR INTERNET CONTENT

RELATED APPLICATION

This application is a continuation of U.S. application Ser. No. 10/456,805 filed Jun. 6, 2003 and claims benefit to U.S. Provisional Application No. 60/387,176, entitled "METHODS AND SYSTEMS FOR IMPLEMENTING A SECURE APPLICATION EXECUTION ENVIRONMENT USING DERIVED USER ACCOUNTS FOR INTERNET CONTENT," filed Jun. 6, 2002, which are expressly incorporated herein by reference.

FIELD

This invention relates generally to computer systems and user applications and, more particularly, to methods and systems for implementing a secure application execution environment using derived user accounts for Internet content.

BACKGROUND

The Internet has become a popular business tool. It provides rapid access to services, instant communication among users and computing systems, and allows for users to collaborate across geographical boundaries. However, in spite of these advantages, the Internet still poses a number of security risks to computing systems. In particular, the vast amount of resources available on the Internet are of unknown origin and communications with such resources are typically unauthenticated. For instance, it is difficult to determine if access to an unknown website resource or receipt of an email causes any security risks to the receiving computing system.

A number of approaches are available that address the security risks associated with using the Internet. One approach involves profiling systems that scan Internet content for known patterns of malicious content such as viruses, worms, etc. Anti-virus scanning software is the most widely used profiling tool for such systems. Such a profiling tool can run automatically when receiving email or downloading web pages. In particular, a server can run profiling software to scan incoming mail or Internet content. A disadvantage of the profiling approach is that the only security risks that are detected are those based on known patterns (e.g., known viruses), which are typically stored in a database. Although the database can be updated with new known patterns, if a pattern is not found in the database, the security risk will not be detected.

Another approach uses cryptographic signatures for guaranteeing the origin of Internet content. A valid signature can only originate from a single signature, generally associated with a signing certificate belonging to an individual user or organization. Knowing the origin of content, a user can make informed decisions about the level of trust or permission to grant to the content. In this manner, the domain of trustable content can be determined based on the signature of the content. A disadvantage of this approach is that too few sources on the Internet use cryptographic signatures when delivering content. Furthermore, both the sending and receiving users must have keys to authenticate the signature. In addition, once content is considered trusted and allowed to run on a computing system, validating the inputs received from the system is problematic. In particular, security attacks based on passing incorrect inputs to processes are well known—e.g., attacks exploiting buffer overflows.

Another approach relates to behavioral pattern-matching systems. These systems monitor the execution history of a user's system, typically in the context of using Internet content. Such systems assess each operation to determine if the operation is allowable in a given context. Moreover, these systems act as dynamically-evolving access control lists in which an operation might be allowed (or not) in one context, but not in other contexts. A disadvantage of this approach is that behavior (operations in a specific context) that is not allowed is based on policy, which can become quite complex in order to prevent unsafe behavior while allowing as much useful behavior as possible.

Another approach uses access control restrictions that can deny certain operations from being performed in a given context. For example, "sandboxing" is a method for activating Internet content in an environment with stricter access controls than a user's normal environment. A sandbox might contain code to start a new restricted execution shell for new content (e.g., a virtual machine for Internet content). A disadvantage of this approach is that it imposes stricter access controls on an application when it is using Internet content. For example, a browser can be prevented from executing JavaScript code to access the file system, or by assigning a special user identity with less privilege than the actual user to Internet content and using the operating system's built-in, user id-based access control schemes (SubOS).

Another approach relates to language-based security that prevents certain statements from being made in the programming language that encodes Internet content. Specifically, this approach enforces strict type-safety to ensure that code can only operate on well-defined set of objects or resources, and compile-time or execution-time checks to ensure that code does not violate security policy. The Java programming, language, for example, implements such techniques in that it does not allow a program to allocate and access arbitrary memory segments, enforces strict type definitions, and employs run-time checks to ensure that code does not violate a user's security policy. A disadvantage of this approach is that it requires knowledge of sophisticated programming techniques.

With all of these approaches, there are drawbacks in providing security for Internet content. Furthermore, any approach protecting computing systems from risks relating to Internet use is more useful if it also preserves the unrestricted access to services and content that makes Internet use productive and valuable. Most approaches to the security issue so far have constrained or interrupted much of the freedom to use resources on the Internet in order to provide some increase in security.

SUMMARY

According to one aspect of the invention, a method is disclosed for providing secure content use. Content is received and a determination is made if the received content is trusted or untrusted content. The content is accessed in a protected derived user account (DUA), if the content is untrusted; otherwise, the content is accessed in a regular DUA, if the content is trusted.

According to another aspect of the invention, a computing system is disclosed for providing secure content use comprising at least one memory and a processor. The at least one memory hosts a protected DUA and a regular DUA. The processor is configured to receive content for the computing system and to determine if the received content is trusted content or untrusted content. The processor is also configured to access the content using the protected DUA if the content is untrusted and to access the content using a regular DUA if the content is trusted.

DESCRIPTION OF THE DRAWINGS

The accompanying drawings, which are incorporated in and constitute a part of the specification, illustrate exemplary implementations and embodiments of the invention and, together with the detailed description, serve to explain the principles of the invention. In the drawings.

DETAILED DESCRIPTION

Reference will now be made in detail to exemplary implementations and embodiments of the invention, examples of which are illustrated in the accompanying drawings. Wherever possible, the same reference numbers will be used throughout the drawings to refer to the same or like parts.

A. Overview

Methods and systems are disclosed that overcome prior approaches to protecting Internet use from security risks by providing a secure application execution environment using derived user accounts ("SAE DUA") for Internet content. According to one example, content is received and a determination is made if the received content is trusted or untrusted content. The content is accessed in a protected derived user account (DUA) such as a SAE DUA, if the content is untrusted; otherwise, the content is accessed in a regular DUA, if the content is trusted. For Internet content, the secured environment can be referred to as a "SAE DUA IC."

In this manner, a secured environment is available for a user to have unmitigated access to untrusted content such as Internet content. A user can thus view and access Internet content while protecting the user's computing system from security risks. The SAE DUA IC can be used if the content is untrusted and a regular DUA can be used if the content is trusted. In such an environment, semantics can be used that are nearly identical to a user's original user account (OUA) within the same computing system.

Thus, a user can freely enjoy the same benefits of Internet content that would be available without any security protections. Such a secured environment prevents corrupt or security adverse Internet content within a computing system from affecting a user's OUA. As such, the security risks posed by Internet content are contained within a secured environment such as a SAE DUA IC, thereby a user's actual computing system can remain protected.

B. User Accounts and Derived User Accounts (DUAs)

The following description details user accounts and DUAs. In order to obtain an understanding of derived user accounts, user accounts must first be explained. User accounts limit the effects of activities by different users to that intended and expected by the users on desktop sharing systems. In particular, user accounts encapsulate the information particular to each individual user, such as the user's name, password, area of transient and persistent storage, configuration information, resource-usage quotas and other properties to be enforced on the user's behavior. By using user accounts, time sharing could be implemented without compromising the systems usability. Whereas previous computer system operations always directly affected the global state of the machine, operations on a user's behalf in systems implementing user accounts typically affect only the information in the user's account. In this manner, each user's actions became isolated from other users since, for the most part, they only affected the individual user's account information.

Figure 1:
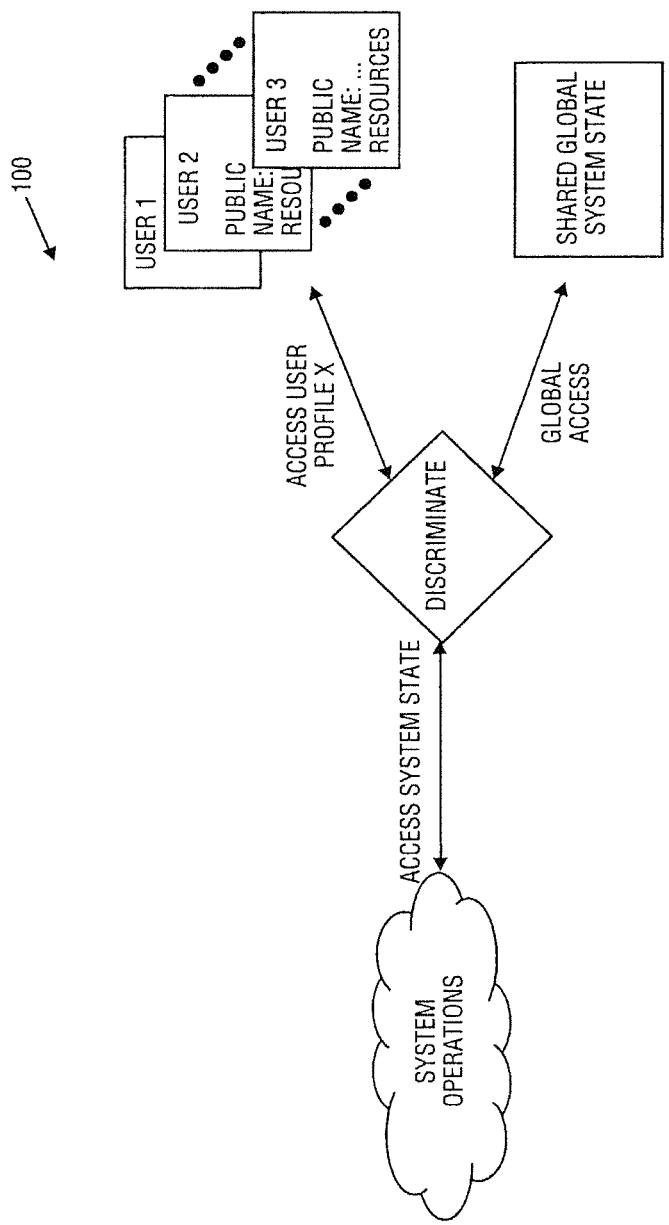
FIG. 1 is a block diagram of an exemplary computing system architecture for implementing user accounts.

FIG. 1 illustrates the components in a computing system 100 implementing user accounts. Each operation that involves accessing the state of the system is discriminated to determine if the state being accessed is local to an individual user account or global to the entire system (and therefore shared between all user accounts). If access is to a user-local state, the discrimination procedure determines the context of the access operation, that is, which user's account information to access. In such a computing system, context may be determined by, for example, using a low-level indirection (for memory accesses), the current virtual memory page tables, or a user account reference in each process or thread control block (for system calls).

Thus, user accounts can be very useful. They enhance usability when multiple individuals simultaneously use a computing system and allow for segregation of system activity based on intent. For example, conventional systems may use a supervisor user account, called "root," to run background services. Also, web-server activities may operate as "nobody," that is, a user account with very limited privileges. Additionally, user accounts are integral to maintaining the security of a multiple user computer system since they may be used to control which data a user may access or actions a user may perform.

DUAs will now be described for certain system operations. DUAs, such as those disclosed in co-pending and commonly owned U.S. patent application Ser. No. 10/144,048, entitled "METHODS AND SYSTEMS FOR USING DERIVED USER ACCOUNTS," filed May 10, 2002, which is incorporated herein by reference, can be used to implement the techniques disclosed herein. DUAs may have all of the properties of traditional user accounts including, but not limited to, its own state, distinct privilege and access control rules, its own unique identifier (such as a security token), and ownership of any system resources. In addition, DUAs are linked to at least one particular existing user account (the Original User Account, or OUA). Through use of a DUA, its OUA may be selectively isolated from system operations taking place in the DUA's context. Since the DUA is a legitimate user account, legacy processes will function correctly in a DUA context while modifications to the OUA can be limited through choice of derivation transformations ("DTs") specified by a set of derivation rules ("DRs").

Figure 2:
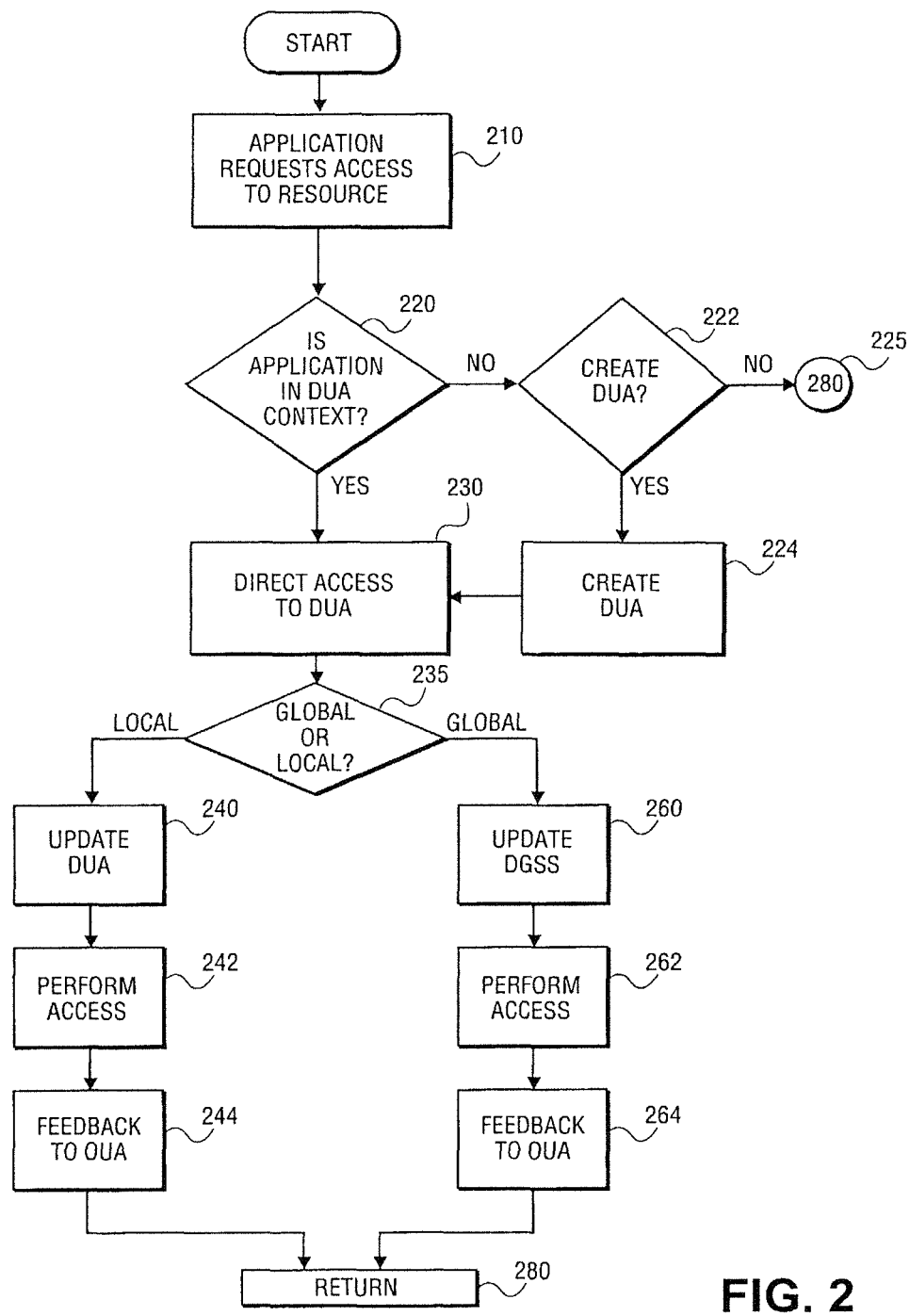
FIG. 2 is a flow diagram of a method for performing access operations using a derived user account.

FIG. 2 illustrates the steps of a method for accessing a resource using a derived user account consistent with the present invention. In one embodiment, a software application, P, requests access to a resource, X (step 210). A "resource" may be, for example, state information, such as data that lies in memory, file systems, registry configurations, other applications, processes, network ports, semaphores, window handles in graphical user interface ("GUI") systems, hardware devices such as a soundcard or printer, or other named abstractions. The system determines if the software application is already running in the context of a DUA (step 220). Methods for determining the context of an object, thread, or other activity are well known to those skilled in the computer software arts. For example, in Microsoft Windows 2000, determining whether a thread is running under a local administrator account may be accomplished by examining the access token that is associated with the thread, the thread's identifier, the thread's creation time, or any other identifier that may be mapped to a specific user account.

If the software application is not running in the context of the DUA, the application determines if a DUA should be "created" (step 222). If the application determines that a DUA should not be created, the application continues normally as in step 280.

If it is determined that a DUA should be created (step 224), a DUA may be created according to any of the following exemplary embodiments. In some embodiments consistent with the present invention, a DUA shell may be created by, for example, creating a new user account, "user 2," that may comprise a set different than, or a subset of, the rights and permissions afforded the original user. A DUA shell is the context and the mechanism for propagating the context. The context includes, for example, all information that would normally be associated with an operation in the OUA, such as user credentials, process id, and other information. DUA shells allow for the automatic propagation of DUA context to all DUA activity, for example, processes or threads, whether they be created directly or indirectly as a result of DUA activity. The initial DUA shell may have been established before run-time or established dynamically during operation of the operating system. The creation of the DUA shell may have been invoked randomly or triggered by some event, such as a write access operation.

In this exemplary embodiment, the new user account may comprise rights and permissions that the original user does not have. The new user account, or DUA shell, may be created, for example, by using the existing user account mechanisms in the operating system. Additionally, the ownership of files or objects created or owned by user 2 may need to be modified post-creation to allow the corresponding OUA to have access, if access by OUA is desired. Similarly, user 2 may, by default, access none or all of the files or objects created or owned by the OUA.

In another exemplary embodiment, a DUA shell may be created by creating a new, possibly restricted, login session or token for the OUA (called OUA', or "OUA prime"). OUA' is distinct and separate from the original OUA session or token, but may have all the same privileges for resources as the OUA, such as, for example, ability to use the same display. In some exemplary embodiments, OUA' may have fewer capabilities than OUA (for example, may not be able to shut down the machine or modify the screen resolution). However, by creating a DUA shell in this fashion in, for example, the Microsoft Windows operating system, the activity of OUA' may be discriminated as the associated token that is automatically propagated to any processes, thread, or other activity created directly or indirectly by OUA.

In yet another embodiment, a process group (in Windows 2000, a "job") may implement the DUA shell. As well as being able to implement a DUA shell, a process group or job may also enforce quotas on resource consumption and, in other ways, control access to resources. For example, a process group or job may perform the automatic context propagation needed for discrimination of the DUA activity.

In still another embodiment, a DUA shell may be created by annotating certain OUA activity as actually belonging to the DUA. Annotation occurs when new OUA activity (that actually belongs to the DUA) is initiated such as, for example, on the creation of a thread, process, or other activity, or the impersonation of the OUA. Annotation may take the form of unique bits or an arbitrary sequence of bits associated with the OUA activity. One example is the use of a distinguished entry in handle tables or file descriptor tables. The annotation may be placed on any one or more components of the OUA activity. In addition, the annotation may be placed on any information in the kernel thread control block ("TCB") or kernel process control block ("PCB"), assuming execution in an operating system with a protected mode kernel. One benefit of annotating information in the kernel TCB or PCB is that the annotation can not be compromised by DUA application activity. In certain embodiments, it is preferred that the annotations are not modified in the ordinary course of events.

In some embodiments where DUA shell implementations automatically propagate the context, the annotation may be done automatically. In other embodiments, such as the embodiment immediately above, new threads, processes, or other activity of the DUA, and those impersonating the DUA, may need to be intercepted and annotated as being in DUA, not OUA, context. In still further embodiments, annotation may involve a combination of automatic annotation and non-automatic annotation.

The DUA may be initialized and maintained based on derivation transformations ("DTs") and derivation rules ("DRs"). Derivation rules are a set of rules that link any aspect of a DUA with the corresponding aspect of its OUA. The derivation rules for a resource, X, include DTs, which are computable functions that take an input, modify the input, and return an output. An argument derivation transformation ("ADT") generally receives an argument as input, modifies the input, and returns a second argument as output, although in some embodiments, an ADT does not modify anything. A result derivation transformation ("RDT") takes as input certain values, modifies the values, and returns modified values. An "update DT" or "UDT" may update the state of a DUA based on its corresponding OUA whereas a "feedback DT" of "FDT" may give feedback from the state of a DUA to the state of its corresponding OUA.

The derivation rules and transformations may be authored by a developer or system administrator. In some embodiments, the derivation rules and transformations may be initially authored by a developer or system administrator but are later modified dynamically. Dynamic rules may be modified during run time according run time dependent conditions or other conditions.

In one embodiment, the derivation rules may take the form of script-like directives. For example, an author of rules may use a text editor or similar device to create a human-readable text file containing the rules. In other embodiments, the rules may be authored in semantic formats such as or similar to known scripting languages or high-level computer languages, or in other formats well known to those skilled in the computer software arts. In still other embodiments, the rules are compiled or otherwise processed by a rule generator into a machine-readable form, which is in turn used by the computer system at run time.

The following is one example of derivation rules consistent with the present invention. The first table comprises an exemplary set of rules for DUA events; the second table comprises an exemplary set of rules for OUA events. Each line in the tables represents a derivation rule which describes the actions that will take place for a particular resource access.

tions by default as specified by design. As shown in the third line of the DUA table, in some embodiments, the operation may be performed on name1, as specified, overriding the default case. This last example may be considered one example of an ADT, as the orgname is modified to name2.

Referring now to the OUA table above, if OUA activity refers to /A/B, and the operation is "read," the system will perform a feedback transformation, Y, using IDUA/A/B as input and /OUA/A/B as output before actually performing the read operation on /OUA/A/B.

There are many possible types of derivation transformations, some examples of which are as follows. "Equivalence DTs" may be used to ensure certain parts of the DUA state and the OUA state remain identical. In this case, for example, the state of the DUA may be copied back to the OUA in a feedback DT or the state of the DUA may be refreshed, for example, by an update DT that copies over one or more aspects of the DUA with information from the OUA. Equivalence DTs may be useful in cases where it is desired to have changes in either the DUA or OUA automatically reflected in the other. For example, the system volume control state may need an equivalence DT if volume changes in a DUA are to have the expected effect.

A "copying DT" can ensure that parts of DUA state are copies of the corresponding OUA state, and that any modifications are performed only on the DUA copy, Copying DTs may be used to limit the effects of operations in DUA context upon the information of its OUA. Copying DTs may be useful in situations where a user may wish to evaluate effects of

| DUA TABLE | | | | | | | |
|---|---|---|---|---|---|---|---|
| orgname | name1 | name2 | open | read | write | list | format |
| /A/B | /OUA/R/S/ | /DUA/A/B/ | U: X | U: Z<br>F: T | F: Y | U: V | |
| /R/S<br>/DEV3 | /MASQ/R/S/<br>/DEV/NUL/ | /DUA/R/S/<br>/DEV/HD1 | U: X' | | | | U: K0<br>A: name1 |

| QUA TABLE | | | | | | | |
|---|---|---|---|---|---|---|---|
| orgname | scrname | destname | open | read | write | list | format |
| /A/B | /DUA/A/B | /QUA/A/B | | F: Y | U: W | | |

As shown in the first line of the DUA table above, if an application operating in DUA context refers to /A/B ("orgname"), and the operation is "read," an update derivation transformation, Z, will be performed using /OUA/A/B as the source ("name1") and /DUA/A/B as the destination ("name2"), after which the actual read operation will be performed on the destination. This is one example of an ADT.

In the example above, the update transformation, Z, may also be followed or preceded by a feedback transformation, T, using /DUA/A/B as the source ("name2") and /OUA/A/B as the destination ("name1").

If an application refers to /R/S/ and the operation is "open," the UDT, V, will be performed taking /MASQ/R/S as the input and /DUA/R/S as the output, after which the open operation will actually be performed on /DUA/R/S. /MASQ/R/S is data introduced by the DUA mechanism or the rules and, as described below, may be unrelated to the OUA.

In some embodiments, whether or not a DT is specified, the operation is performed on an actual named resource or object, with the rules having as a default one of the names specified in the DUA table above. In this particular example, name2 represents the actual named resource accessed by all operaoperations on the system without applying them to the OUA. One example of this would be during installation of new software or during debugging of software. If errors occur while operating with a modified DUA, the original OUA is never actually modified. Thus, operations may revert to the original OUA, and the system may be very quickly and easily returned to the old state. In some embodiments, a user may wish to use a copy DT in non-experimental situations where the system is deliberately operated in the DUA context with no intentions of ever modifying the OUA. This may be useful, for example, for security or integrity reasons. In these embodiments, the DUA may be deliberately discarded after the requested action is performed without update to the OUA.

Yet another example of a derivation transformation is a "masquerading DT." Masquerading DTs can specify properties for certain parts of a DUA state, irrespective of the corresponding state of its OUA. Masquerading DTs can be used to perform operations in a DUA where certain states have values unrelated and (perhaps radically) different from that state's values in the OUA. In fact, a masquerading DT may specify that the data for the DUA may be taken from a source other than the OUA. This type of derivation transformation allows operations to be performed in a modified version of the OUA context. Masquerading DTs may be useful in cases of experimentation because the performance of the system using modified state information may be evaluated without modifying the OUA.

A "partitioning DT" ensures that there is no overlap between certain aspects of the DUA and the OUA state, that is, partitioning their namespace or other sets of values. For example, a partitioning DT may assign a new name, Z, to the DUA and rename the resource, X, to be Y, defined as the concatenation of X with Z. Then, the application is allowed to access the resource Y without accessing the original resource X. Partitioning DTs may be necessary when multiple entities, such as the OUA and DUA, or even multiple DUAs, are concurrently sharing resources and each action must have access to, what appears to be, the full capabilities of that resource. One exemplary operation is the simultaneous access of transient or persistent storage by more than one application. Multiple DUAs can concurrently share state— each believing it has full and exclusive access to that state—as long as a partitioning DT creates a new partition of that namespace for each DUA.

A "liveness DT" changes lifetime properties of certain parts of DUA state from those of its OUA, that is, it may make a state that is persistent in the OUA transient in the DUA. The OUA may even be purged at regularly timed intervals. Conversely, any other such state meta-information including, for example, access control attributes, may be set to differ using a liveness DT between the DUA and its OUA.

"Dynamic DTs" may be used to specify an arbitrary relationship between a certain state value found in both the DUA and the OUA. For example, in one embodiment consistent with the present invention, a dynamic DT may remove the ability of a DUA to set volume to its maximum value, while still retaining the DUA's ability to perform operations affecting volume—simply, the dynamic DT can set OUA volume value to 90%, if the DUA volume value is set to 90% or higher, otherwise effecting an equivalence DT. Similarly, a dynamic DT can affect the introduction of a named state to the DUA when that state is not found in the OUA, or the removal of a named state from the DUA when that state is found in the OUA. A dynamic DT may implement this, for example, by modifying the behavior of all state namespace enumeration operations—and with the assistance of a partitioning DT, either account can create or remove such (introduced or removed) state independently.

Derivation transformations may also specify that if an original state value is within a range [A,B] specified by the derivation rule, then the corresponding state value in the DUA is the original state value of the OUA. If not, the state value of the DUA becomes either A or B, whichever is closer to the original state value. This update derivation transformation may be referred to as a "Bounded value" DT. Feedback may also be bounded in a similar manner. In a feedback bounded value DT, for example, if a state value of the DUA is within a range [A,B] specified by the derivation rule, the OUA will get the state value of the DUA. Otherwise, the OUA will receive whichever of A or B is closer to the state value of the DUA.

Still other examples of derivation transformations consistent with the present invention operate on metadata. For example, it may be desired to initially provide access to all information in a data or file, but when copying is performed, it is desired to limit copying to the contents and not copy the metadata, such as access control permissions, time stamps, and name of the file. The derivation rule may block the copying of the metadata but may provide different information in its place, that is, some or all of the metadata may be masked.

An "enumeration" transformation excludes or adds information to a list. An enumeration" transformation is a variety of a masquerading transformation in the sense that it masks the real information by adding members to the real list or deleting actual members from the real list before allowing access to the list.

It should be noted that there exist many possible derivation transformations and derivation rules. The list above is only exemplary and not meant to comprise the universe of allowable derivation transformations and rules.

Referring back to FIG. 2, once a DUA is created, the application is executed using the DUA, not the original user account. If, for example, the DUA is a new user account, as described above, the application may be redirected to the DUA. If in another example, the DUA is a token, as is also described above, the application may execute based on permissions in the DUA token. In still another example, the arguments of the application may be modified in accordance with the DUA so that the original application may execute on the modified arguments. The method continues from step 230.

If the application is already operating in DUA context (step 220), the application is executed using the DUA (step 230). The system determines whether the resource sought by the application relates only to a specific user account (that is, a "local" resource) or is information that is shared between multiple user accounts (step 235). If the resource is shared, or "global," the DUA contains derived global system state ("DGSS") information and derivation transformation rules that update or feedback to more than one user account.

In either case, the system determines the type of access requested (steps 240 and 260). Additionally, the DUA or DGSS may optionally be updated by information from the OUA based on the applicable derivation rule before the requested activity is performed (steps 242 and 262). These actions help ensure that the system will have access to the most current information in the OUA. After the DUA or DGSS are updated (steps 242 and 262), the requested activity is performed by reading the DUA or DGSS (steps 244 and 264). Depending on the type of access requested and the derivation transformation rules, the system may optionally communicate changes to the DUA or DGSS back to the OUA in a feedback transformation, if such feedback is indicated (steps 246 and 266).

In each case, after the application performs the requested activity, the system is returned to normal operations (step 280).

Figure 3:
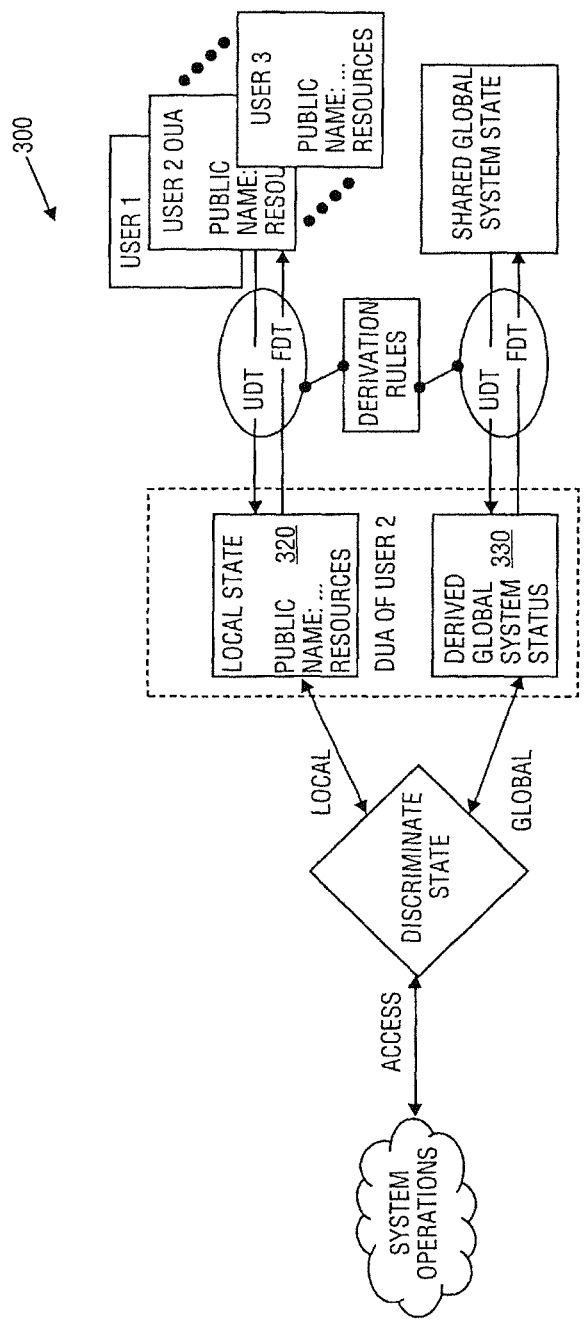
FIG. 3 is block diagram of a system for performing operations accessing state of a derived user account in a multi-user system.

FIG. 3 illustrates the components in a DUA-enabled system consistent with the present invention. As shown in FIG. 3, during operation of an operating system, an application 310 requests access to a system state. Consistent with the principles of the present invention, the system discriminates whether the system is requesting access to local state information 320 of a user account or derived global system state information 330 and directs the requesting application to the appropriate state information of the DUA. As shown in FIG. 3, the DUA state information may be updated based on the corresponding state information of the corresponding OUA and update derivation transformations (UDTs) based on the derivation rules. The DUA may feedback state information to the corresponding OUA based on a feedback transformation (FDT) and the derivation rules. The derived global system state information 330 may be similarly updated based on UDTs and may feed back information to the original shared global system state based on FDTs.

The above represents one exemplary embodiment of the present invention. In some embodiments, DUA events can also occur even though no access is being made to the DUA or OUA resources. In particular, DUA events may occur on a resource X at a specific time, or at specific timed intervals, or given the satisfaction of an arbitrary predicate on the system state or the system environment.

C. Exemplary System Architecture

Figure 4:
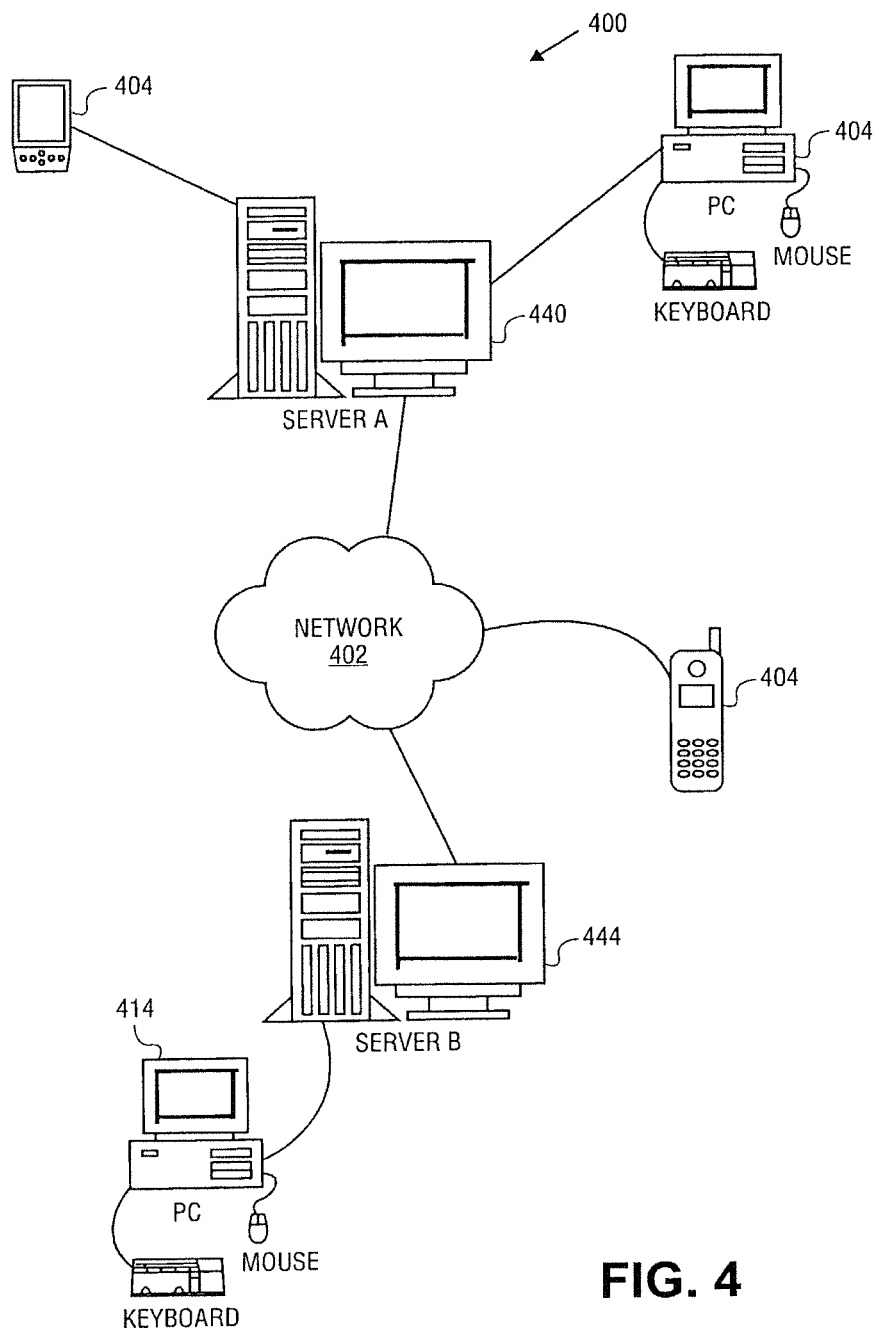
FIG. 4 illustrates one embodiment of a system for using DUAs and implementing ADAS for an application.

FIG. 4 illustrates one embodiment of a system consistent with the present invention. In fact, any conventional computer system supporting the abstraction of user accounts may be programmed to support the principles of the present invention. The system in FIG. 4 represents a computer network 400 that comprises one or more client computers 404 and 414 and one or more servers 440 and 444 interconnected via network 402. In this specification, the terms "client" and "server" are used to refer to a computer's general role as a requester of data (client) or provider of data (server), however each computer may request data in one transaction and provide data in another transaction, thus changing the computer's role from client to server. Client 404 may also be a thin client, which is generally understood to be a network computer without a hard disk drive. Client 404 may also be a personal digital assistant ("PDA"), such as a PalmPilot, a cellular phone, or other computerized device. As shown in FIG. 4, client 404 may be connected to one or more servers by a suitable bus or wireless connection.

In some embodiments, a software application operating on client 404 may place a request that involves data stored on or instructions that are executed on Server A 420. Since client 404 is directly connected to Server A 420, for example, through a local area network, this request would not normally result in a transfer of data or instructions over what is shown as "network" of FIG. 4. The "network" of FIG. 4 represents, for example, the Internet, which is an interconnection of networks. A different request may involve data or instructions stored on Server B 422. In this case, the data may be transferred from Server B 422 through the network to Server A 420 and, finally, to computer 402. The distance between Server A 420 and Server B 422 may be very long, e.g. across states, or very short, e.g., a few inches. Further, in traversing the network the data may be transferred through several intermediate servers and many routing devices, such as bridges and routers.

Figure 5:
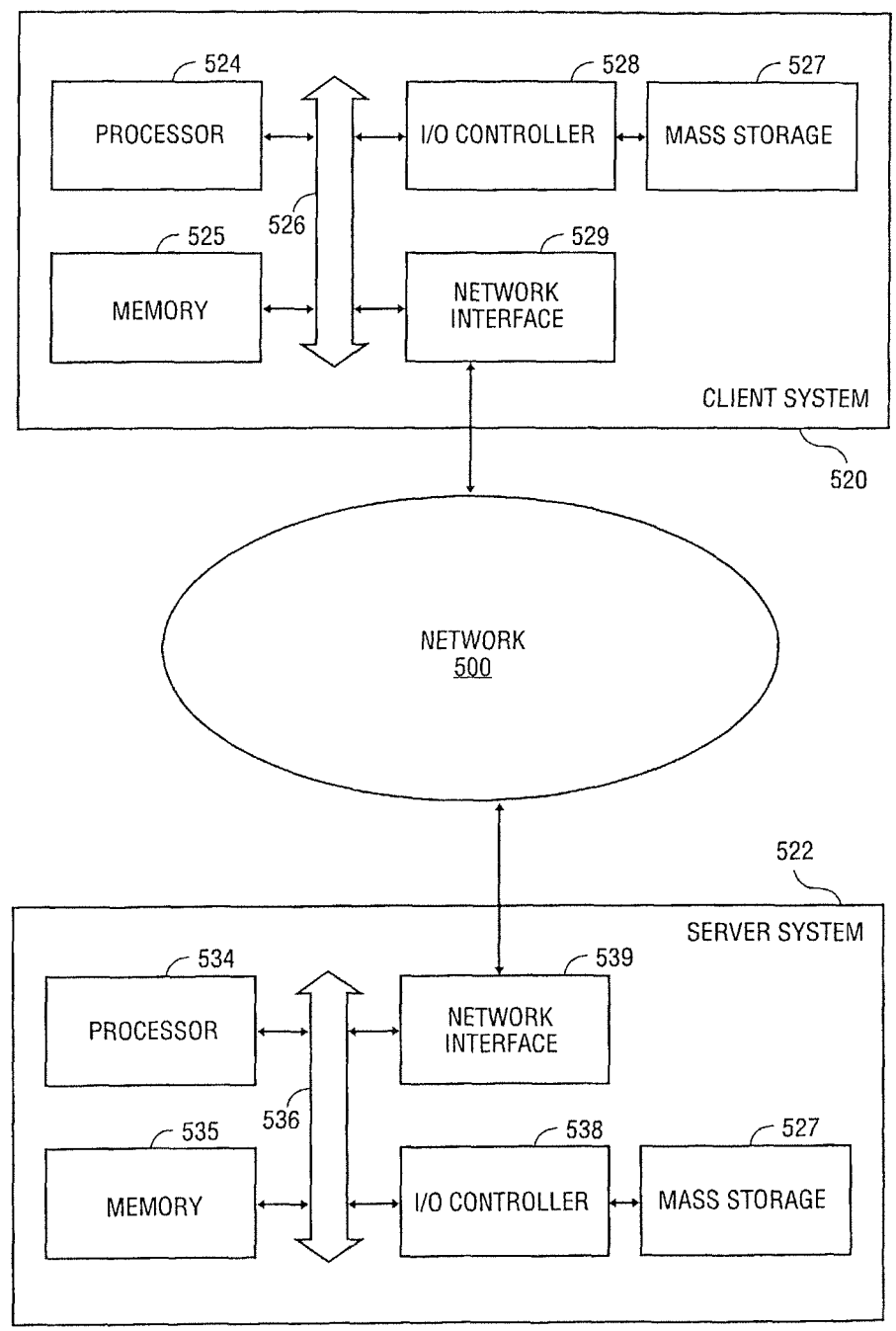
FIG. 5 shows, in more detail, an example of a client-server system interconnected through network.

FIG. 5 shows, in more detail, an example of a client-server system interconnected through network 500. In this example, a server system 522 is interconnected through network 500 to client system 520. Client system 520 includes conventional components such as a processor 524, memory 525 (e.g. RAM), a bus 526 which couples processor 524 and memory 525, a mass storage device 527 (e.g. a magnetic hard disk or an optical storage disk) coupled to processor 524 and memory 525 through an I/O controller 528 and a network interface 529, such as a conventional modem.

Server system 522 also includes conventional components such as a processor 534, memory 535 (e.g. RAM), a bus 536 which couples processor 534 and memory 535, a mass storage device 537 (e.g. a magnetic or optical disk) coupled to processor 534 and memory 535 through an I/O controller 538 and a network interface 539, such as a conventional modem. It will be appreciated from the description below that the present invention may be implemented in software which is stored as executable instructions on a computer readable medium on the client and server systems, such as mass storage devices 527 and 537 respectively, or in memories 525 and 535 respectively. Rules or derivation transformations may be stored in, for example, memory 525 or mass storage 527 on client system 520 or memory 535 or mass storage 537 on server system 522.

Processors 524 and 534 may be microprocessors such as the Pentium® family microprocessors manufactured by Intel Corporation. However, any other suitable microprocessor, micro-, mini-, or mainframe computer, may be used. Memories 525 and 535 may include a random access memory (RAM), a read-only memory (ROM), a video memory, or mass storage. Mass storage 527 and 537 may include both fixed and removable media (e.g., magnetic, optical, or magnetic optical storage systems or other available mass storage technology). Memories 525 and 535 may contain a program, such as an operating system, an application programming interface (API), and other instructions for performing the methods consistent with the invention.

Figure 6:
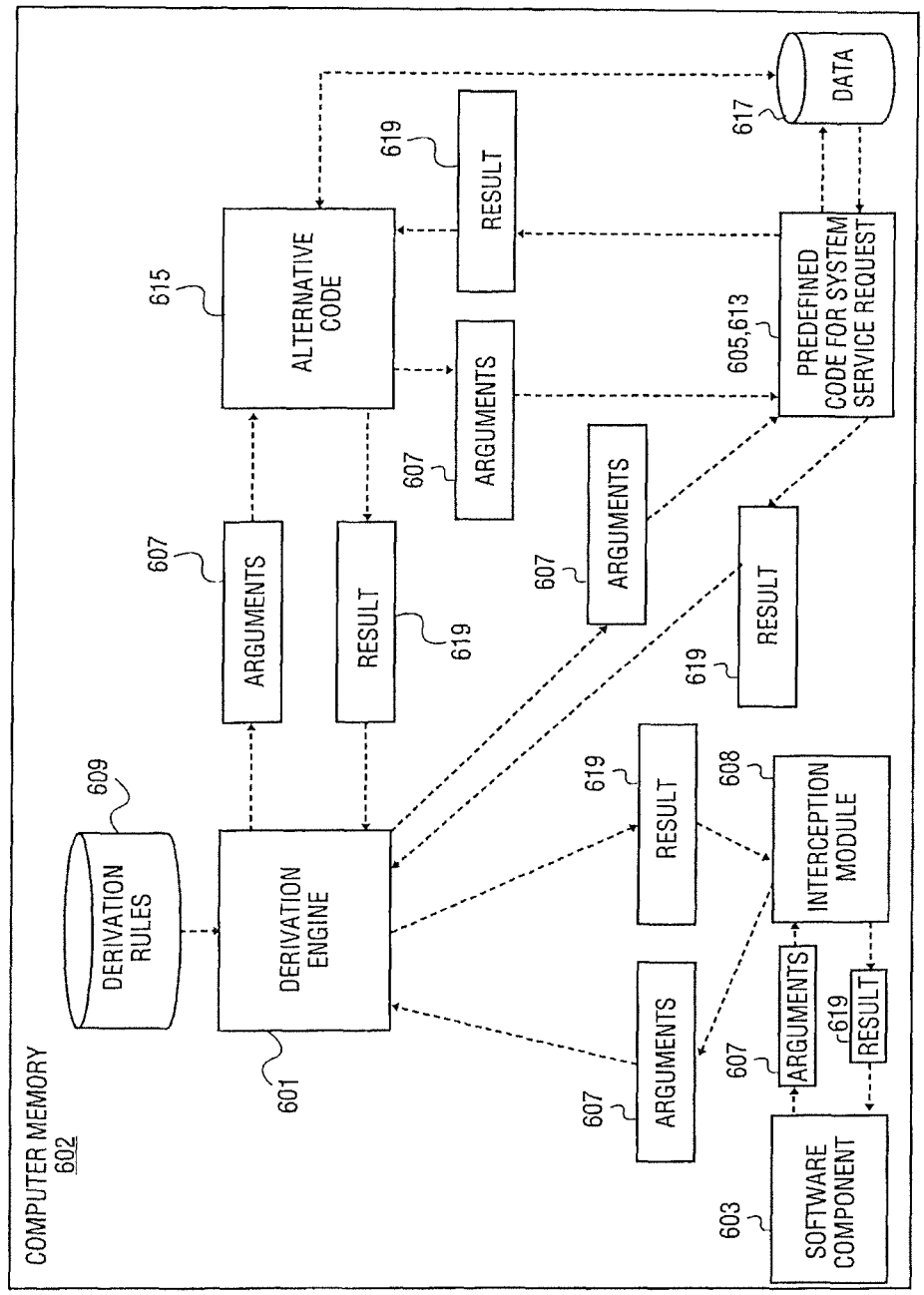
FIG. 6 is a block diagram illustrating one exemplary embodiment of a system using DUAs.

Derived user accounts also may be generated and used in a system, such as that described in co-pending and commonly assigned U.S. patent application Ser. No. 10/082,591 ("the '591 application"), entitled "ALTERED STATES OF SOFTWARE COMPONENT BEHAVIOUR," filed Feb. 22, 2002, which is expressly incorporated herein by reference in its entirety. FIG. 6 illustrates one such exemplary system. As shown in FIG. 6, a software component 603, executing in computer memory 602 may request access to a resource, X. The request may comprise arguments 607, such as a source name or a destination name, and a requested action, such as, for example, open, read, write, list, or format. In one embodiment consistent with the present invention, the request may be intercepted by interception module 608, which may be understood as software code residing between predefined code 605 and the actual software code that is executed in response to the request. Interception module 608 captures the request, including arguments 607, and passes the request and arguments to derivation engine 601 which, as described below, manages the actual calling of code in response to the request.

Techniques for intercepting the request are well known to those of ordinary skill in the software arts. For example, interception of a hardware or software supported system call may comprise redirection of an interrupt service vector to alternative code. For library-based services, interception can take the form of the modification of dynamically-linked libraries (prior to loading or at link time, as desired). For any subroutine or function-based service, redirection of the subroutine call instruction, or machine-code patching of subroutine entry code can be employed. Any service dispatch mechanism based on dynamic name-resolution can be intercepted by a change in the service-lookup namespace.

In other embodiments consistent with the present invention, derivation engine 601 receives a request directly from software component 608. For example, software component 608 may call the derivation engine 601 or derivation engine 601 itself captures software component 608.

Once the request is received by derivation engine 601, either directly or indirectly, derivation engine 601 may consult derivation rules 609, which may be dynamic or static, for assistance in processing the request in accordance with the present invention.

Derivation rules 609 comprise derivation transformations, as described above. Based on the derivation rules 609, derivation engine 601 determines how to direct access to a derived user account. For example, if the request specifies to write data to a location A specified by the request, in the DUA context, the arguments 607 of the request may be modified by derivation engine 601 in accordance with derivation rules 609. In one exemplary embodiment, as described with reference to the DUA table shown above, if a request (which in this example is an application) requests that a read operation be performed on original name "/A/B," and the appropriate derivation rule comprises the derivation transformation, Z, which specifies that read operations on /OUA/A/B should instead be performed on /DUA/A/B, the arguments of the request may be modified so that /DUA/A/B is the source of the data for the read operation.

Once derivation engine 601 modifies arguments 607 in accordance with the derivation rules, derivation engine 601 may pass arguments 607 to predefined code 605 or alternative code 615. In addition, alternative code 615 may invoke predefined code 605 at some point during its execution. In some embodiments, alternative code 615 may modify data 617 or dynamic derivation rules 609. A result 619 may be returned from execution of predefined code 605 or alternative code 615 to derivation engine 601. Derivation engine 601, in turn, returns result 619 to software component 603.

As described in further detail below, the following implementations and embodiments can use modified derived user accounts DUAs in a secured application environment for Internet content in order to provide security protection.

D. Secure Application Execution Environment using DUAs for Internet Content

The following description regarding FIGS. 7-18 describes a secure application environment for Internet content in which modified DUAs are used ("SAE DUA IC"). For this type of environment, the above disclosed DUAs can be modified for Internet content use or for local, trusted content use using some or all of the techniques described below. In other words, a DUA performing some or all of the functions and/or procedures detailed below for Internet content can be referred to as a SAE DUA IC.

Thus, as described in FIGS. 7-18, computing systems, such as those disclosed herein, can implement a secured DUA that provides a seamless but secure access to Internet content by dynamically modifying the environment of a DUA in which Internet content is active. This environment is advantageous in providing security over approaches that apply restrictive allow or deny semantics to operations.

The SAE DUA IC thus activates Internet content in an environment that extends (or resides within) a user's environment, not in an environment that forces a user to choose between exclusive protection domains. In addition, the SAE DUA IC indicates the difference between local, trusted content and Internet, untrusted content and informs the user at all times when content is active in a SAE DUA IC or a regular or normal DUA. The SAE DUA IC extends a computing system operating with both a regular DUA and a SAE DUA IC in the following ways:

Networking restrictions: The use of network resources is partitioned, similar to the use of system resources. The integrity of a user's system can thus be protected by partitioning the network resources and allowing access to external Internet network resources through the SAE DUA IC.

Entry-point Application Enhancements: The SAE DUA IC relies on modification of the behavior of some applications that allow Internet content to enter the computing system. By mediating network access through these applications, content can be activated in the SAE DUA IC or regular DUA according to whether it originates from a trusted network resource.

Integration and Semantic enhancements: Integrating the regular DUA and SAE DUA IC environments requires computing system enhancements that allow a user to identify activity and resources associated with Internet content. This allows safe Internet content to be used seamlessly in a regular DUA and allows user-initiated interaction from the SAE DUA IC to the regular DUA.

Usability enhancements: The SAE DUA IC is tailored so that the SAE DUA IC environment provides the same functionality and behavior as the regular DUA as much as possible and so that users interact with the SAE DUA IC as an extension of their environment, not as a separate security domain.

Performance enhancements: The implementation of computing system modifications to support the SAE DUA IC is optimized to minimize the impact of the environment on a user's time and system resources.

1. Networking Restrictions

Figure 7:
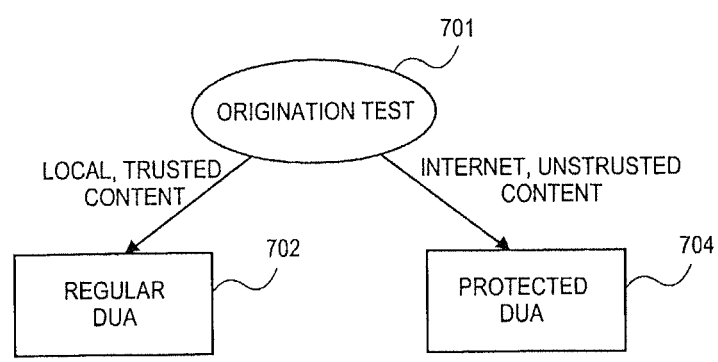
FIG. 7 is a block diagram illustrating one exemplary embodiment of a system using regular and protected DUAs.

FIG. 7 is a block diagram illustrating one exemplary embodiment of a computing system using a regular DUA and a protected DUA (SAE DUA IC) based on an "origination test." At block 701, an origination test is made to discriminate between Internet or untrusted content and local or trusted content, e.g., content from trusted networks or on the local machine. If content is determined to be local or trusted content, the content runs in a regular DUA. If the content is determined to be Internet or untrusted content, the content runs in a protected DUA or a secure application environment using a DUA for Intent content (IC), hereinafter referred to as a "SAE DUA IC." The origination test is described in more detail below regarding FIG. 8.

a. Internet Partitioning and Access Control

Figure 8:
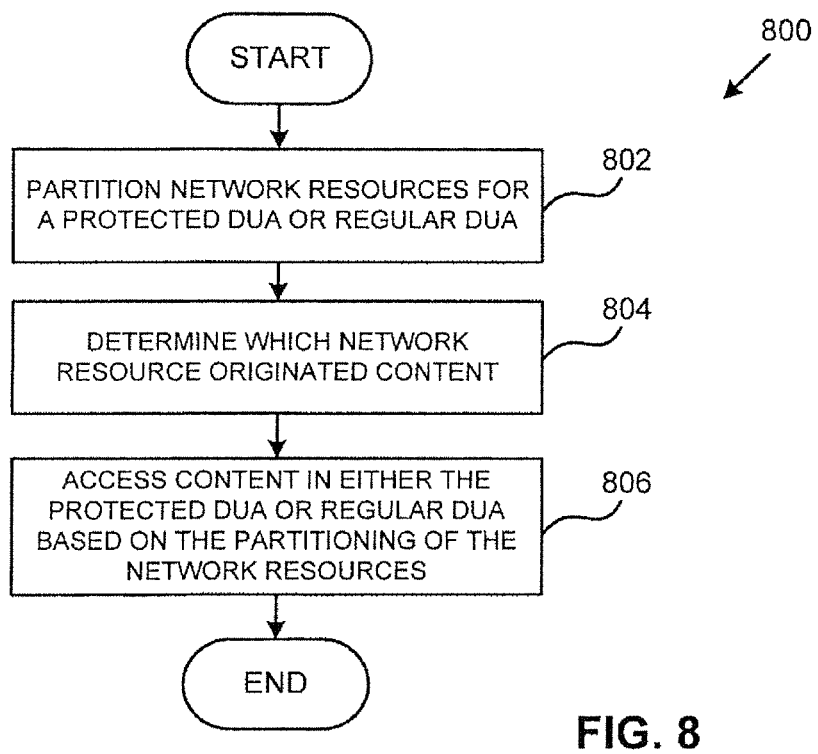
FIG. 8 is a flow diagram of a method for network resource partitioning and access control.

FIG. 8 is a flow diagram of a method 800 for Internet partitioning and access control that can form part of the origination test described in FIG. 7. Initially, network resources are partitioned (step 802). Next, a determination is made regarding which network resource originated the content (step 804). Content is then accessed in either the protected DUA or regular DUA based on the partitioning of the network resources (step 806). These steps are described in further detail below.

Network resources can be partitioned using any number of techniques. Moreover, it should be noted that the collection of network resources need not be intrinsically partitioned into a set belonging to the protected DUA and a set belonging to the regular DUA. Thus, network resources can be partitioned into two types: (1) local or trusted and (2) Internet or untrusted. These resources can be defined by using, e.g., pattern matching rules based on namespaces or addresses. For example, a network resource having an address "'222.222.*.*'" can be defined as Internet or untrusted. As such, connections or content from such an address can be assigned to a protected DUA. Alternatively, if the network resource has a trusted address space, content from such a resource can be assigned a regular DUA without imposing further restrictions or rules.

Other types of network resource identifiers or characteristics can be used to partition the network resources. For instance, on the Internet using the Internet Protocol (IP), IP connection endpoints are uniquely identified by an address, port, and transport protocol. Thus, not only can an IP address be used, but also port and transport protocol identifiers to partition IP related network resources. Typically, well-known services run on standard ports. As a result, different rules can be applied to ports used for sending and receiving content of unknown security. For example, content received on port 25 is for mail, port 80 and 443 for web traffic, all of which are accessed in a protected DUA. Conversely, content received on ports that are well-known, with securable semantics, e.g., port 53 connected to a trusted local network, can be accessed in a regular DUA.

Additionally, well-known services use specific transport protocols, e.g., the hyper-text transport protocol that rely on transmission control protocol (TCP) connections. These protocol identifiers can also be used to partition network resources. In particular, content received using certain protocols on a port-address pair, especially those not supported by the well-known service on the port, can be designated for access in protected DUA. Moreover, content can be prohibited on a connection, e.g., port 80 that receives HTTP traffic over TCP, based on user datagram protocol (UDP) and raw sockets used to receive it.

Furthermore, other, less-reliable abstractions can be used for network partitioning of resources. For instance, abstractions such as Internet hostnames and protocol names can be used. Internet hostnames are names or identifiers used to easily identify IP addresses, e.g., www.examplehostname.com. In addition, hostnames can be used to define internal and external sites. Common internet protocols have well-known names that are used in many contexts instead of port numbers (e.g., http for port 80, ftp for port 23, etc.). These names are used by applications in universal resource locator (URL) identifiers. Network partitioning can use these labels and even limit access to content based on these names. Because such names or identifiers are not reliable indicators of the actual protocol used on a given connection, other techniques can be used, e.g., inspecting packets to look for signature messages to regulate specific protocol traffic.

As noted above, ports can be used for network partitioning and restrictions. It should be noted that port restrictions for protected DUA such as a SAE DUA IC can be enforced so that any Internet-connected application that uses the port on the local machine cannot send messages from inside the protected DUA to an application outside the DUA and vice versa. For example, a table as shown below, can be implemented by providing such restrictions to different environments operating within a computing system.

|            | To |  |  |  |
|------------|-----------|-------------|----------|-----------|
| From       | SAE DUA IC | Regular DUA | Internet | Local net |
| SAE DUA IC | Allowed   | Denied      | Allowed  | Denied*   |
| Regular DUA| Denied    | Allowed     | Denied*  | Allowed   |
| Internet   | Allowed   | Denied*     | N/A      | N/A       |
| Local Net  | Denied*   | Allowed     | N/A      | N/A       |

Furthermore, the mediation of network access calls can modify the behavior of the call. For instance, connections from the SAE DUA IC to internal networks (or from the regular DUA to the Internet) can be redirected to be handled (in some cases) in another DUA instead of being denied. Networking restrictions can also be applied to applications already running in the SAE DUA IC. In particular, the interception of network requests by the DUA shell allows the partitioning policy to be applied to all requests (and to deny requests for internal connections). Similarly, the DUA shell for the regular DUA can restrict actors in the regular DUA from accessing external addresses. By implementing call interception at a low level in the kernel, network connections can be securely regulated for all DUAs.

b. Proxy Services

Proxy services can also be used to implement network partitioning of resources. Private networks connected to the Internet enforce privacy using firewalls that allow only certain network traffic to pass between the private network and a public network such as the Internet. A firewall can be used with proxy servers that allow certain types of traffic to pass between the public and private networks. This allows controlled access to content on public networks, such as the Internet, via the proxy server. Proxy services thus need special handling for specific entry-point applications. Although a proxy server contains an internal address, proxied traffic or content relates to external Internet content. As such, for proxy services, network partitioning can define proxied traffic as external or untrusted by defining the port that the proxy services uses as external. Other ports, however, can be defined as internal or trusted.

2. Entry-Point Application Enhancements

Figure 9:
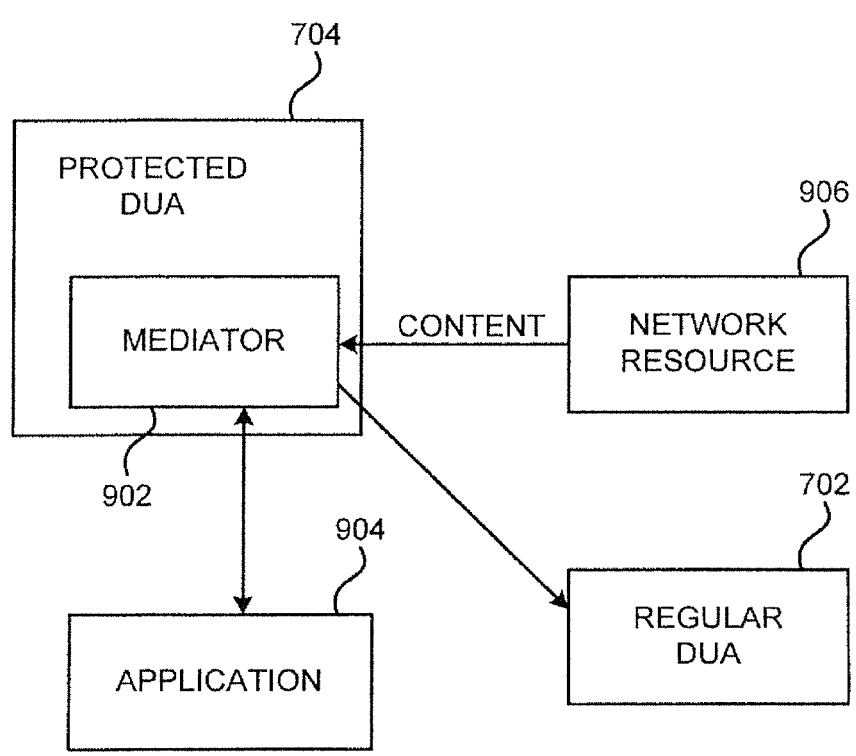
FIG. 9 is a block diagram illustrating one exemplary embodiment of a system using a protected DUA with a mediator.

FIG. 9 is a block diagram illustrating one exemplary embodiment of using protected DUA 704 with a mediator 902. On behalf of protected DUA 704, mediator 902 receives requests from application 904 (operating within a computing system) for content from network 906. Mediator 902 can be any combination of software and/or hardware to implement the functions described herein. Application 904 can act as an entry-point through which content such as Internet content enters the computing system via protected DUA 704. In some examples, mediator 902 can operate within application 904 in controlling access to the content from network resource 906 for the computing system.

For example, mediator 902 can implement simple access control restrictions for application 904 using protected DUA 704 using any number of techniques. In one example, mediator 902 allows or denies application 904 access to content from network resource 906 depending on the request from application 904 that is assigned to protected DUA 704. Other examples allow application 904 to make requests that are transparent and redirected to protected DUA 704 or a regular DUA such as DUA 702. Application 902 operating with mediator 902 can be referred to as "integrated entry-point applications." Entry-point applications that are not integrated are either prohibited for security purposes or can be allowed to operate within, e.g., a regular DUA.

Mediator 902 can also handle system calls from a computing system's operating system dealing with abstractions, such as files, memory addresses, window objects, etc., that can be accessible in protected DUA 704. This requires mediator 902 to work with an entry-point application's abstractions such as email messages, URLs, and email attachments. In one example, mediator 902 controls or mediates access to content from network resource 906 at application layer for application 904 instead of at a system call layer of the computing system in order to implement application-specific semantics on application abstractions.

In such an environment, protected DUA 704 can take advantage of the extensible and reusable qualities of current applications. In particular, most current entry-point applications are implemented at the application layer of operating system services. This provides core functions to other application layer and access to extensible new libraries or "plug-ins." Examples of this environment include browser plug-ins that allow an hyper-text mark-up language HTML browsing application to handle new data types, such as PDFs or streaming audio, or non-browser applications such as Microsoft® Outlook and Windows Explorer® using services from Explorer to render content in HTML.

Because code in the application layer is not protected from access by other applications running, e.g., in a same DUA, mediator 902 runs in protected DUA 704 or even regular DUA 702 so that it cannot be compromised by untrusted content in protected DUA 704. Mediator 902 can operate in between application 904 and network resource 906 in several ways, examples of which include:

Use application-provided interfaces: Many applications provide programmatic interfaces that allow other applications to use their services, often in a modified way. For example, Explorer uses a Browser Helper Object (BHO) for handling requests, but an application can register to receive events from Explorer and modify a request before handing it back to the BHO.

Substitute shared libraries: Many services are provided by shared libraries used by many different applications. For example, Windows® provides a "pluggable protocol handler" library that can be replaced with a library that implements new logic for handling network protocols (such as HTTP). Library substitution can be implemented in several ways. For instance, to replace functionality globally, a shared library in a file system can be substituted; this library can be self-contained or perform actions (modify arguments or results) and also call the original library (perhaps renamed or moved to a different location). To replace functionality only within a specific DUA, a masquerading DT can be used to place the substitute library in the DUA's file system or registry instead of the library in the OUA.

Modified shared libraries: Instead of substituting a library, a mediator can be modified, or patched, before it is used. For example, by intercepting system calls that load the library, the mediator can know when an application loads a library. At that point, the library instructions in the application's memory can be modified so that alternate instructions are executed instead (or in addition).

Created proxy service on the local system: If no programmatic modifications can be made, a proxy service for an application (or an application function) can be created. The proxy is under the control of the protected DUA and implements mediation and modification of the data using application-level semantics. A proxy can be used even when the end application is "opaque" in the sense that its internal operation cannot be inspected or modified. An application can be made to direct all of its requests to the proxy instead of other network servers. The proxy can then implement behavior that guarantees the safety of the requested content. For example, a mail proxy might download all mail before it reaches a user's mail client application. The mail proxy could then examine each message and apply tagging to attachments so they activate in the protected DUA (many other behaviors are possible as well).

Any of the above techniques, tailored for the specific abstractions used by an application, can be used together to create an integrated entry-point application.

a. Non-Integrated Entry-Point Applications

Entry-point applications that are not integrated using the techniques described above might pose a security risk. Nevertheless, a non-integrated web browser can be subject to operating level networking restrictions, so that it will not be able to access content such as Internet content unless it is explicitly launched in protected DUA 704. In this manner, the non-integrated web browser will not be able to access internal content.

However, a non-integrated email client can be able to freely activate Internet content contained in messages it downloads from internal mail servers, which can pose a high-risk security threat. In particular, some non-integrated entry-point applications can be allowed on a computing system. For example, DNS queries or office productivity applications that allow users to download new fonts, templates, and clip art (but do not allow arbitrary network connections) can be allowed. Some non-integrated entry-point applications can be forbidden to be run on the computing system by administrative policy. Because the network layer cannot distinguish between allowed and forbidden applications, forcing a user to use integrated entry-point applications may be problematic.

b. Dynamic Assignment of Content to Appropriate DUA

Figure 10:
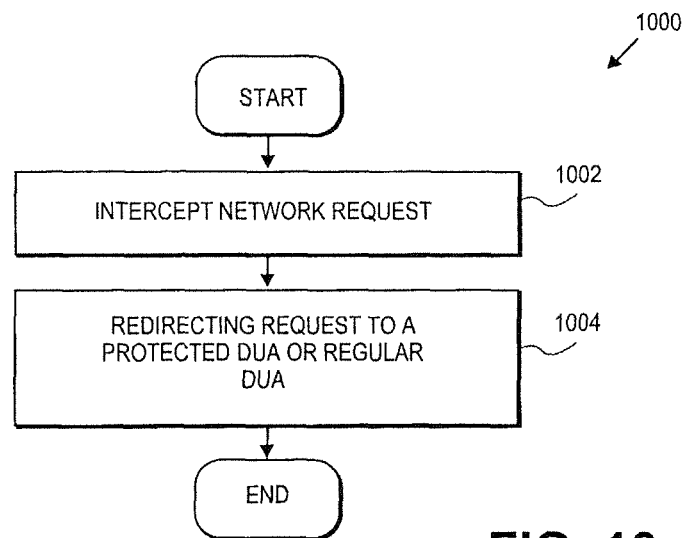
FIG. 10 is a flow diagram of a method for processing an intercepted network request.

FIG. 10 is a flow diagram of a method for processing an intercepted network request. Initially, a network request from an application is intercepted (step 1002). Such an interception can be performed by mediator 902 for a request from application 904 to access content from network resource 906 regarding FIG. 9. Next, the request is redirected to a protected DUA, such as protected DUA 704, or a regular DUA, such as regular DUA 702. These steps are described in further detail below.

The above steps can implement network restrictions or access control mechanisms that prevent a user of an application from accessing untrusted content such as Internet content in a normal manner, which can pose high-security risk. By intercepting the request, content (i.e., untrusted content) can be accessed in a secure environment of a protected DUA. Nevertheless, content can also be accessed in a less secure environment of a regular DUA.

It should be noted that allowing an application to succeed in making a forbidden request by handling the request in another DUA is generally not possible. Specifically, when a network request that is not allowed is intercepted, it is not practical or secure to reinstantiate the calling process in a different DUA, nor to replicate the process state and create a duplicate in another DUA. Most applications require large amounts of private state information and use a number of system resources. Thus, it is not recommended to replicate all of those resources dynamically in another DUA, and simply start a new instance of the application. Such a process can destroy state and execution context information that might be important for particular network request. As such, referring back to FIG. 9, mediator 902 for protected DUA 704 is discouraged from switching to another DUA.

c. Integrating a Web Browser Application

Figure 11:
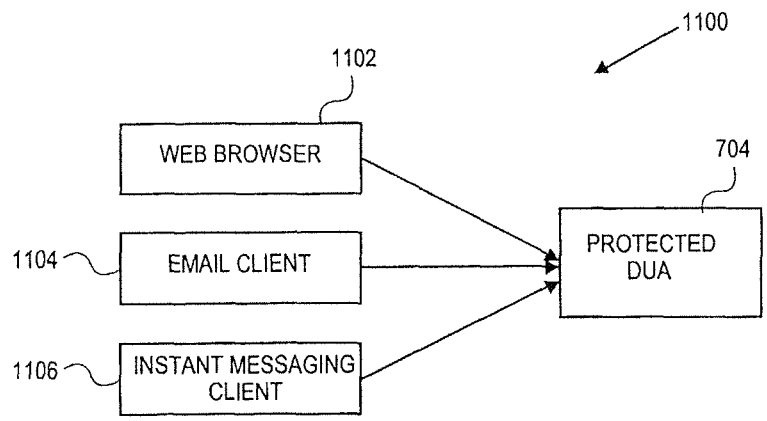
FIG. 11 is block diagram illustrating one exemplary embodiment of a system integrating multiple types of applications in a protected DUA.

FIG. 11 is block diagram illustrating one exemplary embodiment of system 1100 integrating multiple types of applications in a protected DUA 704. In this example, a web browser 1102, email client 1104, and instant messaging client 1106 are shown that are integrated into protected DUA 704. Thus, these applications can be entry-point applications for a computing system. Furthermore, any number of applications can be integrated into protected DUA 704. For purposes of explanation, the following describes web browser 1102 being integrated into protected DUA 704.

The main abstraction used by web browser 1102 is a URL that identifies websites on the Internet. Other abstractions can include bookmarks list, cookies, cache of visited URLs, certificates, preferences, etc. Such abstractions can be used to partition network resources, as described above regarding FIGS. 7 and 8, for use by protected DUA 704.

In order to make web browser 1102 an entry-point application, several elements may be used: Network Restrictions, Assignment of Requests to a DUA, and DTs to handle application abstractions in the protected DUA 704. These elements are described in further detail below.

i. Handling Network Restrictions and Assigning Requests to a DUA

Network restrictions are determined for the URL of a request, that is, before the request is passed to network system calls in a computing system. In one example, the handling of the request is processed by a proxy or proxies. The proxy or proxies can determine whether the request is for Internet content. Such a determination should not occur before the request is forwarded to the proxy or proxies.

A URL consists of three parts: protocol identifier (http, ftp, nntp, etc.); network address and port identifier (a default port is implied by the protocol); and URL identifier that is the name of the resource that maps to the address of the specified port. In order to perform the integration for web browser 1102, the address, port, and protocol can be matched against a network restriction policy to determine if the request is trusted content or untrusted (or Internet) content. Moreover, the network restrictions can have policies that restrict protocols or ports in addition to addresses.

Referring back to FIGS. 9 and 11, mediator 902 can perform the integration by intercepting a request from web browser 1102. In this process, mediator 902 fetches a new URL before web browser 1102 opens a network connection. Mediator 902 determines if the requested protocol and location are allowed to be accessed from the protected DUA 704 in which web browser 1102 may be running in. Otherwise, mediator 902 can invoke a process to start web browser 1102 to service the request in a different DUA such as a regular DUA 702. Additional policies can also be implemented by the mediator 902. For example, if a web page contains frames and one of the frames contains internal content and the other contains Internet content, mediator 902 might have a policy that only fetches the URL for one of the frames and returns a protocol error for the other.

ii. DTs for Handling Application Abstractions

Referring back to FIGS. 9 and 11, requests for web browser 1102 that are not allowed in a regular DUA (such as regular DUA 702) are handled by starting web browser 1102 in the protected DUA 704, such as a SAE DUA IC, and vice versa. In order to obtain identical functionality for a user regardless of the DUA being used that hosts web browser 1102, mediator 902 ensures that application-specific resources exist in the protected DUA 704. Examples of these resources include bookmark lists, cookies, cache of visited URLs, certificates, and preferences. In some examples, most of these resources are translated to the protected DUA 704 by using a copying DT. However, some exceptions exist.

Cookies are stored with an associated website address. Cookies associated with internal websites can be excluded from the protected DUA 704 by, for example, using an enumeration DT. If cookies are tagged when stored on the file system, mediator 902 can use a special code to seek cookie names on the file system. Within the protected DUA 704, a library call can look up a cookie in file storage that needs to be intercepted by mediator 902 to have its argument modified by applying an appropriate tag. The result can be modified to remove the tag before web browser 1102 uses the cookie.

Certificates issued to a user might contain information that should be kept private, especially certificates that identify a user within his or her enterprise. Certificates from Certificate Authorities (CAs) can be used to validate certificates delivered by servers on the Internet. As such, CA certificates can be copied to the protected DUA 704. In some examples, certificates can be excluded from the protected DUA 704 by using an enumeration DT with the certificate database or by using a masquerading DT that substitutes the default database that is delivered with web browser 1102 for the user's database. If usability and security conflicts cannot be resolved, a regular DUA can be used to provide some operability in order for the user to specify which certificates are available in the protected DUA 704.

It should be noted that, as a general scheme, one can initialize an application in a dummy user account to get a safe, default set of sensitive information such as certificates or email address book entries. This is accomplished by creating a separate "dummy" user account on the system, run the application once under that user account so its initialization is complete, and then copy the data over to the part of the system where masquerading data is kept.

Preferences and other application-specific settings can include information that should remain secret, and include other generic information such as default fonts, colors, etc. that should be copied to the protected DUA 704 using an update DT (UDT) and copied to a regular DUA using a feedback DT (FDT). In this manner, the user's experience of a regular DUA is preserved in the protected DUA. When web browser 1102 launches in the protected DUA 704, multiple DTs may apply to entries in preferences table, which can be in files, registry entries, etc. Information such as a user's name and passwords can be masqueraded.

Changes to bookmarks, cookies, and the cache of URLs can be propagated to the OUA by FDTs. For security purposes, when using the protected DUA 704, the protected DUA 704 adds an entry to these lists that should be tagged or labeled to indicated untrusted content or Internet content.

d. Integrating an Email Client

Referring back to FIG. 11, the main abstraction used by email client 1104 is an email message. Other abstractions can include address book information, attachments, mailboxes, certificates, credentials, and preferences. Integrating email client 1104 involves intercepting and modifying operations for email messages and adding support to view or activate message contents in protected DUA 704. The integration process for email client 1104 is described in further detail below.

i. Network Origination Test and Tagging Messages and Attachments

Referring back to FIGS. 9 and 11, mediator 902 intercepts, modifies, and determines whether an email message contains any external content and tags the email message if it contains external content. In one example, mediator 902 uses a tag that is a persistent identifier applied to all email with Internet content. Mediator 902 can intercept calls to retrieve messages from a mail server, then inspect and tag messages before returning them to email client 1104. In particular, mediator 902 intercepts operations that open a message, such as read, reply, forward, attach to new message, and print. If tagging is not performed when an email message is retrieved, tagging can also be done when the email message is opened. When an operation requests to open a message, mediator 902 can determine whether to open it in a regular DUA or the protected DUA 704.

Thus, tagged messages and attachments can be activated in the protected DUA. The tag should travel with the email message if, for example, it is forwarded to other users. In this manner, email client 1104 may need to be modified to also tag email messages when it sends them. Email messages include meta-information in "mail headers." A set of standard headers are defined by the Simple Mail Transfer Protocol (SMTP) for labeling Internet email. SMTP also specifies methods for appending non-standard headers. Other mail exchange protocols, such as Microsoft's Messaging Application Programming Interface (MAPI) also contain headers.

The headers contain information that identifies the sender, recipient, mail transfer servers, time sent, and any attachments included with the main message body. The mail headers can indicate the source (internal or external) of an email message. Other methods of determining the origin of a message include running a filter on a server that tags all messages that do not arrive from known internal mail. The server can relay and separate email by network configuration policy so that internal email is sent to a mailbox on one server and external email is delivered to a separate mailbox on another server.

Figure 12:
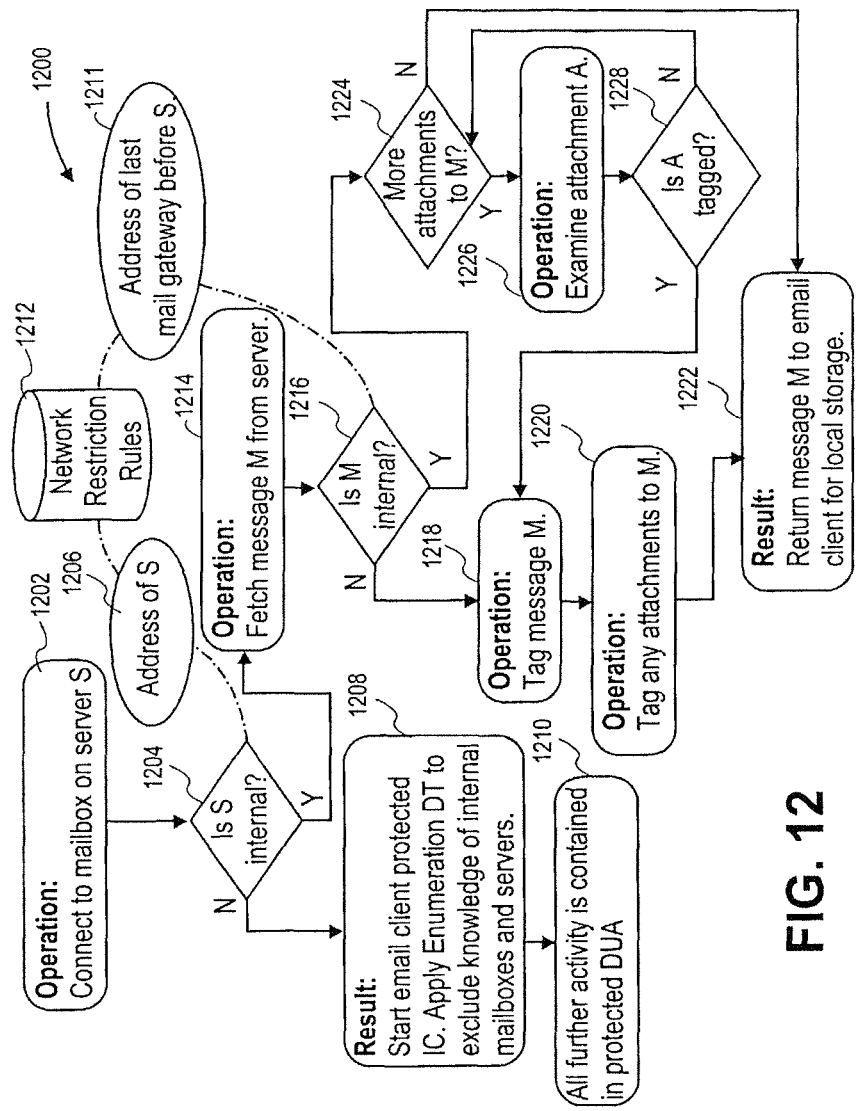
FIG. 12 is a flow diagram of a method for using network restrictions to identify tagged messages with Internet content.

FIG. 12 is a flow diagram of a method 1200 for using network restriction rules to identify tagged messages with Internet content. Initially, an operation is initiated to connect to a mailbox on server S (step 1202). Next, a check is made to determine if the server S is internal (step 1204). If S is not internal, an email is started in a protected IC and an enumeration DT is applied to exclude knowledge of internal mailboxes and servers (step 1208). Then all further activity is contained in a protected DUA (step 1210). At step 1204, if the server S is internal, an operation is performed to fetch message M from the server S (step 1214). Along with the operation at step 1214, the address of server S is obtained (step 1206). This address is matched with network restriction rules in a database (step 1212). Afterwards, the address of the last mail gateway before the server S is obtained (step 1211).

From step 1214, a check is made to determine if the fetched message M is internal (step 1216). If the message M is not internal, an operation is performed to tag the message M (step 1218). If there are any attachments to the message, the attachments are tagged (step 1220). Then the message M is returned to email client 1104 for local storage. At step 1216, if the message is internal, a check is made to determine if there are more attachments to message M. If there are no more attachments, the method continues to step 1222. If there are more attachments, an operation is performed to examine attachment A (step 1226). Next, a check is made to determine if the attachment A is tagged. If the attachment A is tagged, the method continues to step 1218. If the attachment A is not tagged, the method continues back to (step 1224).

As can be seen from FIG. 12, when email client 1104 connects to an external server, a new email client is launched in the protected DUA 704 and all operations on messages and attachments are activated in the protected DUA 704. In addition, when email client 1104 connects to an internal server, messages are fetched individually. Each message is inspected, and if it originates from an external server or contains any tagged attachments, the message is tagged. The determination of origin can be based, for example, on the SMTP "Received" header added by an email gateway server. If the message was received by a server that accepts Internet mail, any message received from that server is tagged. Only mail servers that cannot receive external mail, e.g., internal servers behind a firewall are trusted to deliver internal mail messages. The remaining message payload is examined to check for tagged attachments. If a message contains any tagged attachments, the entire message can be tagged so that any operations on it, which might unknowingly activate the attachment are safely isolated in the protected DUA 704.

ii. Activating Message Content in the Appropriate DUA

Referring back to FIGS. 9, 11, and 12, once messages and attachments are properly tagged, operations on messages can be processed by mediator 902 to ensure that activating a message's content occurs in the proper DUA, that is, protected DUA 704 or regular DUA 702. The method of activating a message in the protected DUA 704 can depend on the capabilities of email client 1104.

In the ideal case, email client 1104 exposes application programming interfaces that allow another application to perform operations (such as, for example, open, edit, print) on arbitrary messages. In the worst case, there is no way to separate message handling from other application activities, and the entire email client runs in the protected DUA 704 and the protected DUA 704 handles even internal messages.

Most systems are likely to fall somewhere in between the two extremes. For example, mediator 902 intercepts and acts on calls to open a tagged message. Contemporary email clients—such as Netscape® Communicator and Microsoft® Outlook—provide user interface controls for displaying individual messages in their own windows. This forces tagged messages to always display in such a window, thereby allowing content to be activated within the protected DUA 704. The interception might require patching email client 1104 or simply interposing a monitor at the operating system level that monitors all mouse-window interaction events and invokes the protected DUA 704 when an event indicates that the user operates on a tagged message.

Even a single-message viewing window instantiated in the protected DUA 704 can use some application abstractions derived from the OUA application settings. Examples of these abstractions include an address book replying to or forwarding a message, certificates for verifying signatures and signing, plug-ins or special attachment handlers, application preferences for font sizes, colors, default editing application, mail formatting options, etc., and lists of local "folders" or mailboxes for filing messages (an application-specific "save as" operation). For usability, the address book and signing certificates should be identical to the objects in the OUA, if the message comes from a "mixed use" mailbox where a user works with both internal and external email.

Users should be able to forward and reply to tagged messages in the same way that they work with internal and self-composed messages. To protect the sensitive information in the address book and certificates database, a trusted path such as described in FIG. 15, can be created to establish a user's intent. For example, a dialog box for selecting messages from an address book can be replaced by an identical dialog box under the control of the mediator instead of the application. Operations on the address book are only allowed if they originate from this trusted, substitute dialog box. Thus, an email virus that tries to programmatically use the address book to replicate itself will not find any entries in the address book because it is unable to use the trusted path.

e. Integrating an Instant Messaging

Referring back to FIGS. 9, 11, and 12, the main application abstractions used to integrate instant messaging client 1106 ("IM client 1106") to the protected DUA 704 are contact, server, credentials, and preferences. IM client 1106 is, in some ways, a very simplified email client. The store and forward processes of an email client allow content from a variety of sources to be mixed in a single mailbox or even in a single message. For IM client 1106, messages do not need to be stored, but can be sent to a single, central server and discarded if they cannot be delivered. There is no sharing of content such as when one forwards an email message from a session with one contact to a session with another contact, except by using OS facilities such as copy-and-paste that can be handled safely by the protected DUA 704.

Thus, IM client 1106 involves mainly separating the servers used into internal and external servers based on network restriction rules as described in FIG. 8. All sessions initiated or received are handled by an instance of IM client 1106 running in the protected DUA 704. Because no session can be initiated or received until a user authenticates and signs into the server, the separation of a regular DUA and a protected DUA, IM client 1106 does not have to be dynamic. Moreover, when a user requests to sign in to a server, usually when IM client 1106 starts, there is no state or history that needs to be handled: the only information required is the user's credentials and list of contacts.

3. Application-Specific Protected DUA

Figure 13:
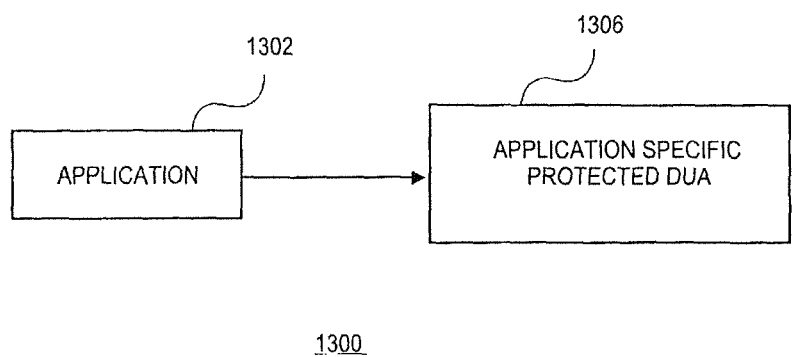
FIG. 13 is a block diagram illustrating one exemplary embodiment of a system using an application-specific protected DUA.

FIG. 13 is a block diagram illustrating one exemplary embodiment of a system 1300 using an application-specific protected DUA. In this example, application 1302 is associated with an application-specific protected DUA 1306. In other words, protected DUA 1306 can only be used by application 1302.

Internet content can be used to extend a user's computing environment by installing new applications or extensions to existing applications. Normally, these new applications or extensions modify the actual environment and can affect other applications, sometimes in intentionally adverse ways.

Thus, application-specific protected DUA 1306 allows users to extend their systems in this way. This DUA also allows multiple system extensions and applications to be installed and run without affecting other activities on the system or each other. If some malicious application or extension is installed, it cannot disrupt the normal environment, nor any of the other applications and data a user has downloaded from the Internet.

The application-specific protected DUA 1306 contains all of the new and modified resources installed, and keeps persistent objects in an area partitioned off for the application, e.g., a partitioned path in the file system or registry. Furthermore, any new resources created by using application 1302 can be stored in the partitioned space, or tagged and stored in normal repositories. The application-specific protected DUA 1306 can be explicitly persistent, so that it behaves the way a user expects installed software or extensions to behave. If the computing system is restarted, application 1302 and its associated resources can still be available, and still be able to launch within the application-specific protected DUA 1306.

Application 1302 that is associated with application-specific protected DUA 1306 can be made accessible as if it were an extension to the user's normal computing environment. That is, application 1302 can be invokable by using the standard user interface controls on the computing system, with application 1302 starting in its specific DUA 1306. For example, application 1302 might appear on the Windows® Start Menu or in a special system folder for applications.

When the application runs, DTs substitute any global system resources with the resources that the application installed. For example, if application 1302 replaces a system library, the new library is stored in the application-specific protected DUA 1306 partition in the file system and requests in the DUA 1306 are redirected to the new library. This overlay ensures that the application has all of the resources it requires, without affecting system resource used by other applications.

Application-specific protected DUA 1306 can use individual partitions, compartments, and tag identifiers. In some examples, common schemes available in the operating system can be used to minimize overhead and complexity. For example, a single tag identifier can be used for all tagged files in Windows® 2000. When a file is activated, the file-to-application associations in the users environment determine the application to launch. If application 1302 is associated with application-specific protected DUA 1306, this DUA is used to launch application 1302.

One potential use of application-specific protected DUA 1306 is for web browser 1102. Contemporary web browsers are, in some ways, systems of their own: they provide access to content and support extensions (plug-ins) that enable new content types to be executed within their scope. Application-specific protected DUA 1306 can be defined specifically for using Internet content through web browser 1102. New plug-ins and extensions such as custom toolbars can be downloaded and installed persistently. Web browser 1102 for an application-specific protected DUA might not be presented as an additional application, or it can be transparently invoked whenever Internet content is accessed via web browser 1102.

4. Protected DUA for Data Containment

Figure 14:
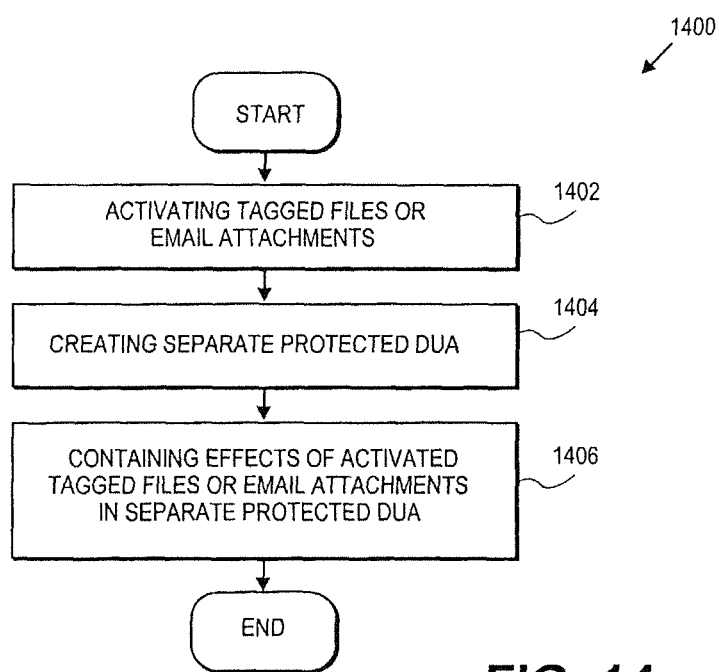
FIG. 14 is a flow diagram of a method for processing tagged files or email attachments for a protected DUA.

FIG. 14 is a flow diagram of a method 1400 for processing tagged files or email attachments for a protected DUA. Initially, tagged files or email attachments are activated (step 1402). A separate protected DUA is created (step 1404). The protected DUA referred to in method 400 can refer to protected DUA 704 or application-specific protected DUA 1306. For purposes of explanation, protected DUA 704 is referred to. The effects of the activated tagged files or email attachments are contained in a separate protected DUA 704 (step 1406).

Thus, the purpose of the protected DUA 704 is to contain the scope of any operations that result from activating the tagged file or email attachment. As such, a separate protected DUA 704 can be created when tagged files or email attachments are activated. In one example, the protected DUA 704 for containment operates based on at least privilege, and grants limited access rights to the application launched to activate the tagged file or email attachment. The protected DUA 704 for data containment can use those system and application resources necessary to run the application, but it does not need to read or modify any data files other than the resource explicitly requested by the user and any new files created during the application session.

The protected DUA 704 contains the effects of activating the file to the file itself. It should be noted that most content will behave properly without requiring access to read or modify other data files, memory, registry entries, etc. outside of the scope of a specific application instance. In some examples, application-specific semantics imply a contract or relation between a data file and other resources; these semantics can be recognized and enforced (per application) by allowing access to files that are related by some application-specific contract. For example, in some Windows® 2000 applications, saving a file as HTML creates an associated folder of support files (images, etc.). This folder is semantically an extension of the HTML data file as far as the applications are concerned; access to the file should also allow access the related folder and its files, copying the file to a new location should also copy the folder, etc.

The protected DUA 704 for data containment is intended to facilitate the safe use of resources that already reside (tagged) in some persistent data store. The protected DUA 704 is transient, and only exists while the requested application runs with the requested file or attachment open. Attempts to read other data files will either create a new protected DUA for data containment for the newly requested resource, create or use an application instance in the regular DUA (if non-tagged files are "visible" from the SAE DUA for data containment), or fail. Files that are not tagged should not be visible to an application in the protected DUA 704, except by using user interface controls that are assured to be controlled by the user. Unless explicitly requested by the user, attempts to access other files should fail. Attempts to save or copy the file (or other data) used to launch the protected DUA 704 should save the file with a tag to permanently associate the data with a protected DUA.

5. Determination of User Intent

Figure 15:
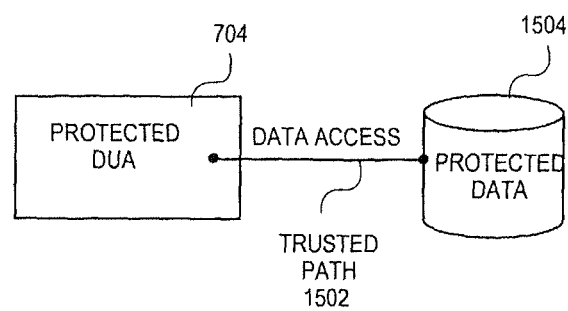
FIG. 15 is a block diagram illustrating one exemplary embodiment of a system using a protected DUA with a trusted path.

Many operations should be allowed if the user requests them and prohibited if a non-user actor requests them. There should be, therefore, a method available to the mediator to discriminate user intentions from operations that originate in arbitrary (potentially malicious) code. FIG. 15 is a block diagram illustrating one exemplary embodiment of a system using a protected DUA 704 with a trusted path 1502 to protected data 1504. The protected DUA 704 can use trusted path 1502 to ensure that operations truly are user requests.

Trusted path 1502 can be mandatory security enforcement mechanism for which certain guarantees about the two endpoints of trusted path 1502 can be made. For example, in Windows® 2000, pressing the keys Ctrl, Alt, and Del at the same time transfers control of the system from a user's desktop to a special Windows® Security desktop. Interaction with the security desktop can occur on trusted path 1502 because the system can guarantee that only the user's keystrokes can display the desktop and that only the security desktop can be reached by those keystrokes, that is, trusted path 1502 is established explicitly by the user. The protected DUA 704 would like to implicitly establish trusted paths for operations not normally associated with a security mechanism by the user such as "save a file."

The protected DUA 704 thus allows a user to access protected data 1504 such as the user's address book, the file system, email folders, and windows outside of the protected DUA 704 (for operations like drag-and-drop). Such access is prohibited if it is not initiated by the user.

A user-initiated operation originates from somewhere in the input/output framework of the environment: typically a mouse-window interaction in a modem operating system. The protected DUA 704 can establish trusted path 1502 by substituting input/output paths with a path under its control. The operations associated with the path are not allowed except via trusted path 1502. For example, when a user chooses to save a file, the protected DUA 704 displays a "choose location" dialog box that it controls instead of the normal dialog. The protected DUA 704 can then apply policies and transformations to the request, based on the location chosen, for example, it can deny access or tag the saved filename. When a request to save a file from within the protected DUA 704 is intercepted, and the context or execution history does not indicate that trusted path 1502 is being used, the request is denied.

In cases where it is not possible to substitute a user interface control in the input path, other techniques can be used to monitor the user's interaction with the system. For example, subscribing to mouse pointer and keyboard events might allow a process to recognize that a request to launch an application came from a user's "double-click," and not from a malicious program.

The same trusted paths can be used in the regular DUA for some operations. For example, launching an application to activate a file is an operation that should be regulated. In Windows® 2000, the ability to perform this operation on tagged files should be limited to double-clicking the file in some window. In this case, the application to activate the file is launched in the protected DUA 704. Other methods for activating the file (programmatically or from the command line) might not be under the user's control and can be prohibited.

6. Identifying and Integrating Internet Content

Figure 16:
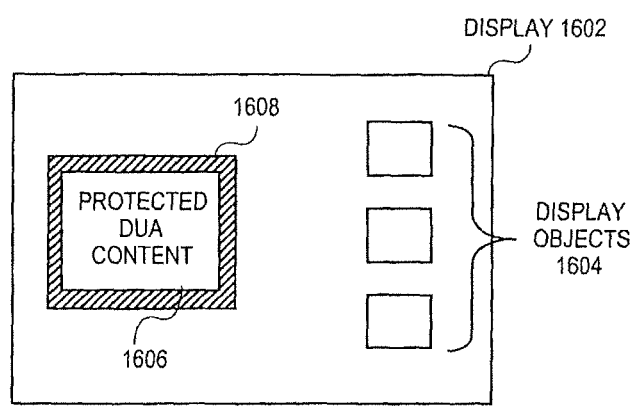
FIG. 16 is a block diagram illustrating one exemplary embodiment of a system having a display showing a tagged protected DUA content.

FIG. 16 is a block diagram illustrating one exemplary embodiment of a system having a display 1602 showing a tagged protected DUA content 1606. In this example, a protected DUA can provide a safety zone for activating Internet content within the user's computing environment. As shown, protected DUA content 1606 is integrated with a users display environment having display objects 1604 unobtrusively, but easily identifiable with a marker 1606 that outlines the protected DUA content as content within a protected DUA. Thus, several usability features ensure that the protected DUA operates as an integrated extension of the user's computing environment, examples of which include:

Visual markers: For instance, visual maker 1608 identifies the protected DUA content 1606, which can be a uniform tag, a marker on file icons, or window borders. In this example, marker 1606 is shown as a border around protected DUA content 1606. Such indicators distinguishes DUA content from regular content in the same space, i.e., display objects 1604 such as folders or files.

Persistent objects: These objects can be tagged by the protected DUA, and the user's environment can correctly and consistently use the tags to activate content in the protected DUA.

Transient objects: These objects are able to move from the protected DUA to the normal environment, with some expected modifications or restrictions to enforce security.

It should be noted that users can have control over their computing environment: user-activated controls can be provided that allow content to be permanently removed from the protected DUA to remove the tagging.

a. Visual Identification of Interaction with Internet Content

Windows® and other user interface objects that host Internet content should operate in the same environment as other windows, but they should clearly indicate to the user that their contents are external and possibly not trustworthy. A window that contains Internet content can be distinguished from other windows by a number of methods: changing the color of its frame, adding an additional colored frame, changing the color of the title bar, adding an icon to the title bar, etc. For example, as shown in FIG. 16, marker 1608 can change colors to indicate that it is a window for protected DUA content.

Persistent resources, such as files, that are tagged as Internet content should also be easily distinguished from "regular" objects in the system. The identifier can be the unique tag applied to a resource, although this is not the most usable solution (the name might be long and increase the time it takes for a user to understand labels). In a system such as Windows® 2000, the icons of tagged resources can be modified by adding some visual cue that indicates Internet content. Again such indications can be shown using marker 1608 in FIG. 16.

b. Handling Persistent Data Tagging

Figure 17:
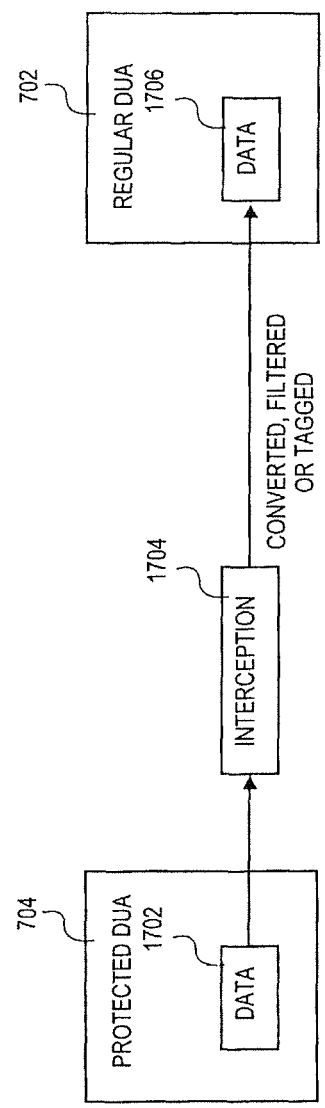
FIG. 17 is a block diagram illustrating one exemplary embodiment of a system showing a data transfer from a protected DUA being intercepted to a regular DUA.

FIG. 17 is a block diagram illustrating one exemplary embodiment of a system showing a data transfer from a protected DUA 704 being intercepted to a regular DUA 702. In this system, an interception module 1704 can receive data 1702 from protected DUA 704 and convert, filter, tag the data that is delivered as data 1706 for regular DUA 1706. Thus, any data object that is saved persistently from the protected DUA 704 should be tagged by interception module 1704 so that it is permanently associated with Internet content. Applying a unique tag to resources can be defined for a general protected DUA.

Interception module 1704 can be application-layer code that accesses these data objects and modifies the data objects with argument DTs and result DTs. Interception module 1704 can apply and remove tags as needed. The permanent tag on an object such as a file may not be removable by normal operations such as rename or copy. An optional trusted path mechanism such as the one shown in FIG. 15 can be provided to allow a protected method for users to remove tags from files.

Operations in the regular DUA 702 (or other DUAs) can also recognize tags and modify the semantics of operations on tagged objects. Whenever a tagged file is activated, e.g., as an argument to an application on the command line or in Dynamic Data Exchange messages generated by double-clicking a file, it runs in protected DUA 704. For instance, double-clicking a tagged file in the regular DUA 702 causes an application to start in the protected DUA 704 to view the file contents, even if the normal behavior is to display the contents in an application window that is already running. Application-level abstractions in permanent storage that require tagging include: files in the file system, messages in mailboxes, attachments to messages, URLs in a web browser's cache, and cookies.

c. Handling Transient Data Filtering

Referring back to FIG. 17, users will sometimes move data from one application to another by making a transient, in-memory copy of the data. For example, the Windows® 2000 operating system uses a "clipboard" abstraction for holding data that has been copied, cut, or dragged from one window to be pasted or dropped in another.

Because the user interface controls of both regular and protected DUAs coexist in the same interface "space" (for example, windows coexisting on the same "desktop"), users expect to be able to move data between the two environments using their normal operations such as drag-and-drop (DND) and copy-and-paste (CNP)). Such data transfers store the data to be moved in transient storage or memory, verify that the destination selected by the user will accept the data, then copy the data from transient storage to the target.

Interception module 1704 can thus intercept access to clipboard-like abstractions to ensure that only data that can certainly be defined as safe is allowed to move from the protected DUA 704 to the regular DUA 702. The data on the clipboard is converted to a known safe type (such as plain text or a bitmap image) before copying it to the destination window. Data that cannot be converted is discarded. If the data is transferred as a contained abstraction (for example, copying a mail message or file in whole, rather than some portion of the raw data it contains), the object that is copied to the destination is tagged.

In addition to converting/filtering and tagging data, the secrecy and security of the user interface interactions are protected. The process that transfers the data between applications sends and receives events and messages to determine if and how to transfer the data. These messages might contain information about resources in another DUA which should not be available to any actor in a SAE DUA IC. To protect such information, a proxy is used between the clipboard-like transfer mechanism and the target application selected by the user. For example, in Windows® 2000, this proxy could be a small, transparent window that moves directly beneath the mouse pointer. Any window events from windows beneath the mouse are received by the transparent proxy window and only forwarded if it is safe to do so (e.g., only after it has been determined that it is safe to transfer the data).

Similarly, users will sometimes want to mix resources from the regular DUA 702 and the protected DUA 704 in a single application. For example, in a word processing document, a user might include several images, some of which have been downloaded from the Internet.

d. User-Activated Control

The protected DUA 704 can be enhanced for usability by providing a trusted path mechanism, such as that shown in FIG. 15, that allows users to explicitly remove the tag from resources such as files. This allows a user to decide that, for the sake of unmitigated integration with some data or application in the regular DUA 702, some Internet content is trusted and no longer should run in the protected DUA 704.

7. Protecting System Availability

Figure 18:
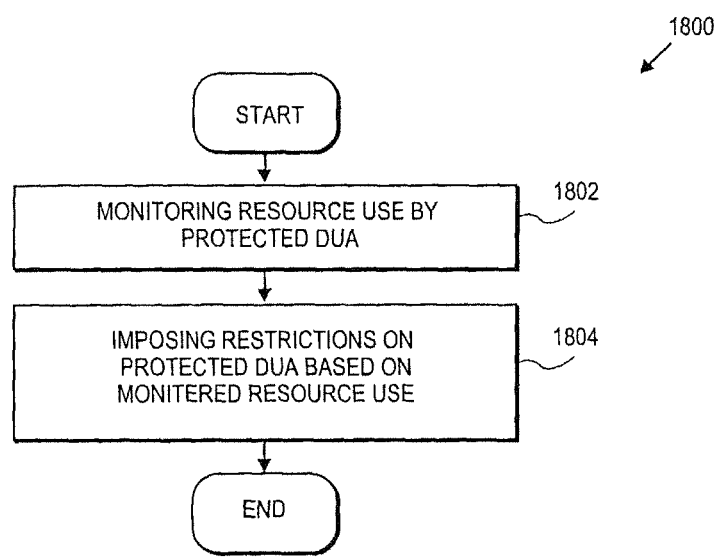
FIG. 18 is a flow diagram of a method for monitoring resource use by a protected DUA.

FIG. 18 is a flow diagram of a method 1800 for monitoring resource use by a protected DUA. For purposes of explanation, method 1800 refers to protected DUA 704. Initially, resource use by protected DUA 704 is monitored (step 1802). Restrictions are imposed on the protected DUA 704 based on the monitored resource use (step 1804). The above steps are explained in further detail below.

Internet content that is allowed to run freely can compromise a system by consuming so many resources that other actors do not have enough resources to run. The protected DUA 704 protects the system against such attacks on system availability by imposing quotas on the resources available to it. These quotas can be relatively generous or permissive in most cases. Modern operating systems have built-in scheduling and sharing mechanisms that grant processes access to resources such as CPU time and memory despite the consumption of other processes (except in the most extreme cases). Thus, these quotas do not need to interfere with the behavior of Internet content that is not malicious.

The resources that need to be limited to protect system availability include: CPU time, Memory usage, Disk space, Open files and pipes, Open network connections.

These resources can be monitored by examining data structures or by using programming interfaces in the kernel (protected from application-level actors) of most contemporary operating systems. If the protected DUA 704, or an actor in the protected DUA 704, uses excessive resources, action can be taken. For example, the offending process can simply be terminated. Different actions can be applied for different resources. In particular, exceeding a disk space quota might automatically prevent further writes because it is hard to recover disk space, but exceeding a memory quota might generate a warning because the excess might be temporary and the memory is easy to recover by terminating the process.

For usability, instead of taking silent action, the user should be informed of the resource consumption and given a choice about how to proceed. For example, if an actor is consuming 70% of available memory, a user interface control can be displayed that informs the user and gives the user the option to terminate it immediately, allow it to continue, or to allow it for now and check again later. If the user does not respond to the information within a set time, the protected DUA 704 can take action automatically to prevent availability attacks that are either invisible to the user or that attempt to run while the user is not present.

Thus, methods and systems are disclosed for implementing a secure application execution environment using derived user accounts for Internet content. Furthermore, the present invention also relates to computer readable media that include program instructions or program code for performing various computer-implemented operations based on the methods of the present invention. The program instructions may be those specially designed and constructed for the purposes of the invention, or they may be of the kind well-known and available to those having skill in the computer software arts. Examples of program instructions include machine code, such as produced by a compiler, and files containing a high level code that can be executed by the computer using, for example, an interpreter or equivalent execution engine to facilitate execution of high level code. Alternative embodiments will become apparent to those skilled in the art to which the present invention pertains without departing from its spirit and scope. Accordingly, the scope of the present invention is defined by the appended claims rather than the foregoing description.

What is claimed is:

1. A method for providing resource content use comprising:
   requesting a resource at a computing system, wherein the resource is associated with an application layer abstraction in an application;
   intercepting the request for the resource using a mediator at an application layer;
   determining, using the mediator, if the resource is trusted or untrusted to enable application layer semantics for the application layer abstraction;
   if the resource is determined to be trusted, accessing the resource in a first derived user account (DUA); and if the resource is determined to be untrusted, create a protected DUA, accessing the resource in the protected DUA, redirect the intercepted request to the protected DUA, wherein the protected DUA provides unrestricted access to the resource, and wherein the protected DUA and the first DUA are both associated with a same user and are dynamically invoked based on the resource within a same integrated user environment of the same user to enable an integrated execution environment for both trusted and untrusted resources.

2. The method of claim 1, wherein the determining further comprises:
receiving content from the resource at the computing system.

3. The method of claim 2, wherein the determining further comprises:
determining, using the mediator, if the resource is trusted or untrusted based on a partition of the resource.

4. The method of claim 3, wherein the determining further comprises:
identifying the resource based on a characteristic of the resource; and
partitioning the resource as trusted or untrusted based on the identified characteristic.

5. The method of claim 1, further comprising:
creating the first DUA when the resource is trusted; and
redirecting the intercepted request to the first DUA when the resource is trusted.

6. The method of claim 1, wherein the protected DUA is different than an original user account (OUA) or a DUA associated with the application.

7. The method of claim 1, wherein the application layer abstraction is an email message, instant message, uniform resource locator (URL), cookie, certificate, or template.

8. A computing system for providing secure content comprising:
at least one memory hosting a protected derived user account (DUA) and a first DUA; and
at least one processor configured to:
request a resource at a computing system, wherein the resource is associated with an application layer abstraction in an application;
intercept the request for the resource using a mediator at an application layer;
determine, using the mediator, if the resource is trusted or untrusted to enable application layer semantics for the application layer abstraction;
if the resource is determined to be trusted, access the resource in the first derived user account (DUA); and
if the resource is determined to be untrusted, create a protected DUA, access the resource in the protected DUA, redirect the intercepted request to the protected DUA, wherein the protected DUA provides unrestricted access to the resource, and wherein the protected DUA and the first DUA are both associated with a same user and are dynamically invoked based on the resource within a same integrated user environment of the same user to enable an integrated execution environment for both trusted and untrusted resources.

9. The computing system of claim 8, wherein the processor is further configured to receive content from the resource at the computing system.

10. The computing system of claim 9, wherein the processor is further configured to:
determine, using the mediator, if the resource is trusted or untrusted based on a partition of the resource.

11. The computing system of claim 10, wherein the processor is further configured to:
identify the resource based on a characteristic of the resource; and
partition the resource as trusted or untrusted based on the identified characteristic.

12. The computing system of claim 8, wherein the processor is further configured to:
create the first DUA when the resource is trusted; and
redirect the intercepted request to the first DUA when the resource is trusted.

13. The computing system of claim 8, wherein the protected DUA is different than an original user account (OUA) or a DUA associated with the application.

14. The computing system of claim 8, wherein the application layer abstraction is an email message, instant message, uniform resource locator (URL), cookie, certificate, or template.

15. A non-transitory computer-readable medium containing instructions for controlling a computing system having at least one processor, to perform a method comprising:
requesting a resource at the computing system, wherein the resource is associated with an application layer abstraction in an application;
intercepting the request for the resource using a mediator at an application layer;
determining, using the mediator, if the resource is trusted or untrusted to enable application layer semantics for the application layer abstraction;
if the resource is determined to be trusted, accessing the resource in a first derived user account (DUA); and
if the resource is determined to be untrusted, create a protected DUA, accessing the resource in the protected DUA, redirect the intercepted request to the protected DUA wherein the protected DUA provides unrestricted access to the resource, and wherein the protected DUA and the first DUA are both associated with a same user and are dynamically invoked based on the resource within a same integrated user environment of the same user to enable an integrated execution environment for both trusted and untrusted resources.

16. The non-transitory computer-readable medium of claim 15, wherein the instructions further control the computing system to perform a method comprising: receiving content from the resource at the computing system.

17. The non-transitory computer-readable medium of claim 16, wherein the instructions further control the computing system to perform a method comprising: determining, using the mediator, if the resource is trusted or untrusted based on a partition of the resource.

18. The non-transitory computer-readable medium of claim 17, wherein the instructions further control the computing system to perform a method comprising: identifying the resource based on a characteristic of the resource; and partitioning the resource as trusted or untrusted based on the identified characteristic.

19. The non-transitory computer-readable medium of claim 15, wherein the instructions further control the computing system to perform a method comprising: creating the first DUA when the resource is trusted; and redirecting the intercepted request to the first DUA when the resource is trusted.

20. The computer-readable medium of claim 15, wherein the protected DUA is different than an original user account (OUA) or a DUA associated with the application.

21. The non-transitory computer-readable medium of claim 15, wherein the application layer abstraction is an email message, instant message, uniform resource locator (URL), cookie, certificate, or template.

* * * * *